(12) United States Patent
Nomura

(10) Patent No.: US 7,978,424 B2
(45) Date of Patent: Jul. 12, 2011

(54) LENS BARREL

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 228 days.

(21) Appl. No.: 12/494,646

(22) Filed: Jun. 30, 2009

(65) Prior Publication Data

US 2010/0002316 A1 Jan. 7, 2010

(30) Foreign Application Priority Data

Jul. 4, 2008 (JP) ................... 2008-176103

(51) Int. Cl.
*G02B 7/02* (2006.01)
*G02B 5/02* (2006.01)

(52) U.S. Cl. ...................... 359/817; 396/349

(58) Field of Classification Search .................. 359/676, 359/689, 817, 826; 396/349, 73
See application file for complete search history.

(56) References Cited

U.S. PATENT DOCUMENTS

| | | | | |
|---|---|---|---|---|
| 7,773,871 B2* | 8/2010 | Ishizuka | ................. | 359/817 |
| 2001/0017984 A1* | 8/2001 | Kabe et al. | ................. | 396/349 |
| 2004/0141736 A1 | 7/2004 | Nomura | | |
| 2005/0207748 A1 | 9/2005 | Ishizuka et al. | | |
| 2006/0115250 A1 | 6/2006 | Nomura | | |
| 2006/0115253 A1 | 6/2006 | Nomura | | |
| 2006/0115255 A1 | 6/2006 | Nomura | | |
| 2006/0193625 A1 | 8/2006 | Nomura | | |

FOREIGN PATENT DOCUMENTS

JP 2005-266345 9/2005

OTHER PUBLICATIONS

English language Abstract of JP 2005-266345, Sep. 29, 2005.
U.S. Appl. No. 12/413,724 to Sasaki, filed Mar. 30, 2009.

* cited by examiner

*Primary Examiner* — Alicia M Harrington
(74) *Attorney, Agent, or Firm* — Greenblum & Bernstein P.L.C.

(57) ABSTRACT

A lens barrel includes front and rear holding members holding front and rear optical elements; an advancing/retracting member; a first guide portion guiding the front holding member relative to the advancing/retracting member; a first biasing member biasing the front holding member rearwards; a second guide portion guiding the rear holding member independently of the advancing/retracting member; a second biasing member biasing the rear holding member forwards; and first contact portions provided between the front and rear holding members, a rearward movement of the front holding member causing the first contact portions to contact and transmit a rearward moving force to the rear holding member when the lens barrel moves to the lens barrel accommodated state. The first and second guide portions, force-applied portions provided between the first/second biasing members and the front/rear holding members, and the first contact portions being all positioned within one of four equiangular ranges.

11 Claims, 12 Drawing Sheets

LENS BARREL

BACKGROUND OF THE INVENTION

1. Field of the Invention

The present invention relates to a lens barrel, more specifically to a retraction mechanism of a lens barrel for retracting the lens barrel when no pictures are taken.

2. Description of the Related Art

In a retractable lens barrel for a camera that reduces the length thereof in a non-photograph state (accommodated state/retracted state) for the purpose of miniaturization of the camera, specifically for reduction in thickness of the camera, a further reduction in length of the lens barrel in the retracted state has been desired. For instance, in the photographic lenses of lens shutter cameras, it is often the case that a light quantity control unit including a shutter and an adjustable diaphragm is supported by a support member via a lens group holding frame. Although a light quantity control component such as a set of shutter blades or diaphragm blades must be located at optically designed positions at a time of exposure, the light quantity control component becomes free from the optical constraints thereon when the lens barrel is in the retracted state, and accordingly, the length of the lens barrel in the retracted state can be reduced by bringing the light quantity control unit close to an adjacent lens group in the optical axis direction when the lens barrel is fully retracted. The assignee of the present invention has proposed a retraction mechanism of a lens barrel using such a technique in United States Patent Application Publication No. US 2005/0207748 A1 (Japanese Patent Application Publication No. 2005-266345).

In the lens barrel disclosed in United States Patent Application Publication No. US 2005/0207748 A1, a retractable lens group support ring (second lens group support ring) which holds a shutter unit is linearly guided by a linear guide ring, and the movement of the retractable lens group support ring in the optical axis direction is controlled via a cam ring. This retractable lens group support ring is provided therein with a rotatable lens frame (i.e., a radially-retractable lens frame) which holds a lens group. The rotatable lens frame is linearly guided so as to be relatively movable in the optical axis direction along an eccentric pivot. In a ready-to-photograph state, the rotatable lens frame is held inside, and at the rear end of, the retractable lens group support ring. During a lens barrel accommodation operation (in which the lens groups of the lens barrel are retracted rearwardly to an accommodated state), upon the retractable lens group support ring moving rearwardly in the optical axis direction, firstly, the retractable lens group support ring and the rotatable lens frame move rearwardly together until the rotatable lens frame abuts against a position-control cam provided at a rearward position. Upon the rotatable lens frame abutting against the position-control cam, the rotatable lens frame rotates from a ready-to-photograph position on the optical axis to a radially-retracted position while the rearward movement of the rotatable lens frame is controlled by the position-control cam. Thereafter, further rearward movement of the retractable lens group support ring in the optical axis direction causes the rotatable lens frame to move forwardly, relative to the retractable lens group support ring so as to change (reduce) the distance in the optical axis direction between the shutter unit and the lens group. With such operations, a reduction in length of the lens barrel is achieved. Meanwhile, in the case of making the lens barrel perform a retracting operation using pressing forces due to relative contact between such front and rear optical element holding members, each of these optical element holding members is required to move smoothly without inclining or tilting relative to the original moving direction thereof (optical axis direction). Specifically, in the case where the front and rear optical element holding members are biased forward or rearward in the optical axis direction, the actuation capability of the front and rear optical element holding members needs to be improved by examining the effects of the biasing force applied to the front and rear optical element holding members.

SUMMARY OF THE INVENTION

The present invention provides a lens barrel including front and rear optical element holding members which are controlled to move in an optical axis direction by relative contact therebetween when the lens barrel moves from a ready-to-photograph state to the lens barrel accommodated state, wherein a smooth and reliable operation of the lens barrel is achieved.

According to an aspect of the present invention, a lens barrel is provided, including a front holding member and a rear holding member which hold a front optical element and a rear optical element, respectively, the rear holding member being provided behind the front holding member in an optical axis direction; an advancing/retracting member which is moved rearward in the optical axis direction when the lens barrel moves from a ready-to-photograph state to a lens barrel accommodated state, in which no pictures can be taken; a first guide portion which guides the front holding member in the optical axis direction relative to the advancing/retracting member; a first biasing member which biases the front holding member rearwards in the optical axis direction; a second guide portion which guides the rear holding member in the optical axis direction independently of the advancing/retracting member; a second biasing member which biases the rear holding member toward front in the optical axis direction; and first contact portions provided between the front holding member and the rear holding member, respectively, a rearward movement of the front holding member due to a rearward movement of the advancing/retracting member causing the first contact portions to come into contact with each other to transmit a rearward moving force of the front holding member to the rear holding member against a biasing force of the second biasing member when the lens barrel moves from the ready-to-photograph state to the lens barrel accommodated state. The first guide portion, the second guide portion, a first force-applied portion provided between the first biasing member and the front holding member at which the first biasing member and the front holding member are in contact, a second force-applied portion provided between the second biasing member and the rear holding member at which the second biasing member and the rear holding member are in contact with each other, and the first contact portions are all positioned within one of four angular ranges about the optical axis which are defined by dividing 360° into four equiangular ranges as viewed from the front or back of the lens barrel along the optical axis.

It is desirable for the lens barrel to include a first stopper which is fixed to the advancing/retracting member and determines a rear movement limit of the front holding member with respect to the advancing/retracting member, and a second stopper, a position of which in the optical axis direction is controllable, that determines a front movement limit of the rear holding member.

It is desirable for the lens barrel to include second contact portions provided between a rear member, which is provided behind the rear holding member, and one of the front holding member and the rear holding member. During a retracting operation of the lens barrel from the ready-to-photograph state to the lens barrel accommodated state, the second contact portions come into contact with each other before the advancing/retracting member reaches a rear movement limit thereof to limit a rearward movement of the front holding member relative to the rear member one of directly and indirectly via the rear holding member so as to cause relative movement between the front holding member and the advancing/retracting member in the optical axis direction against a biasing force of the first biasing member. The second contact portions are positioned within the one of the four angular ranges.

It is desirable for the rear holding member to include an optical element holding portion which holds the rear optical element, and a radial arm which extends radially outwards from the optical element holding portion, a radially outer end of the radial arm being guided by the second guide portion. The first contact portions include a first rear projection which projects rearward in the optical axis direction from the front holding member to be capable of coming into contact with a front surface of the radial arm.

It is desirable for the second contact portions to include a second rear projection which projects rearward in the optical axis direction from the front holding member to be capable of coming into contact with a front projection formed on the rear member.

It is desirable for the second contact portions to include a rear surface formed on the radial arm of the rear holding member, the rear surface facing rearwardly in the optical axis direction; and an abutting surface formed on the rear member, the abutting surface facing forwardly in the optical axis direction to face the rear surface of the radial arm.

It is desirable for the rear member to include a stationary member which holds an image sensor so that the image sensor lies at an image forming position of an optical system of the lens barrel.

Although the front and rear optical elements that are held by the front holding member and the rear holding member, respectively, are optional in the present invention, it is desirable for the front optical element that is held by the front holding member to include light quantity control elements which can be opened and shut, and for the rear optical element that is held by the rear holding member to be a lens group. It is desirable for the advancing/retracting member to hold a front lens group provided in front of the light quantity control elements when the lens barrel is in the ready-to-photograph state, so that, when the lens barrel moves from the ready-to-photograph state to the lens barrel accommodated state, a movement of the front holding member relative to the advancing/retracting member in the optical axis direction causes the light quantity control elements, which are opened, to surround the outer periphery of the front lens group so that the light quantity control elements and the front lens group coincide with each other in a plane orthogonal to the optical axis. Accordingly, a reduction in length of the lens barrel when the lens barrel is fully retracted is achieved.

It is desirable for each of the first biasing member and the second biasing member to be a spring.

It is desirable for the second guide portion to include a guide shaft extending in the optical axis direction; and a guide hole which is formed through the rear holding member and in which the guide shaft is inserted.

According to the present invention, each of the front optical element holding member and the rear optical element holding member does not easily tilt during a retraction operation of the lens barrel to the fully retracted state, and accordingly, a smooth operation of the lens barrel is achieved. In addition, regarding the second contact portions that limit the rearward movement of the front holding member to cause a movement of the front holding member relative to the advancing/retracting member during a retraction operation of the lens barrel to the fully retracted state, a more smooth operation of the lens barrel at a higher level of accuracy is achieved by positioning the second contact portion within the one of the four angular ranges.

The present disclosure relates to subject matter contained in Japanese Patent Application No. 2008-176103 (filed on Jul. 4, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
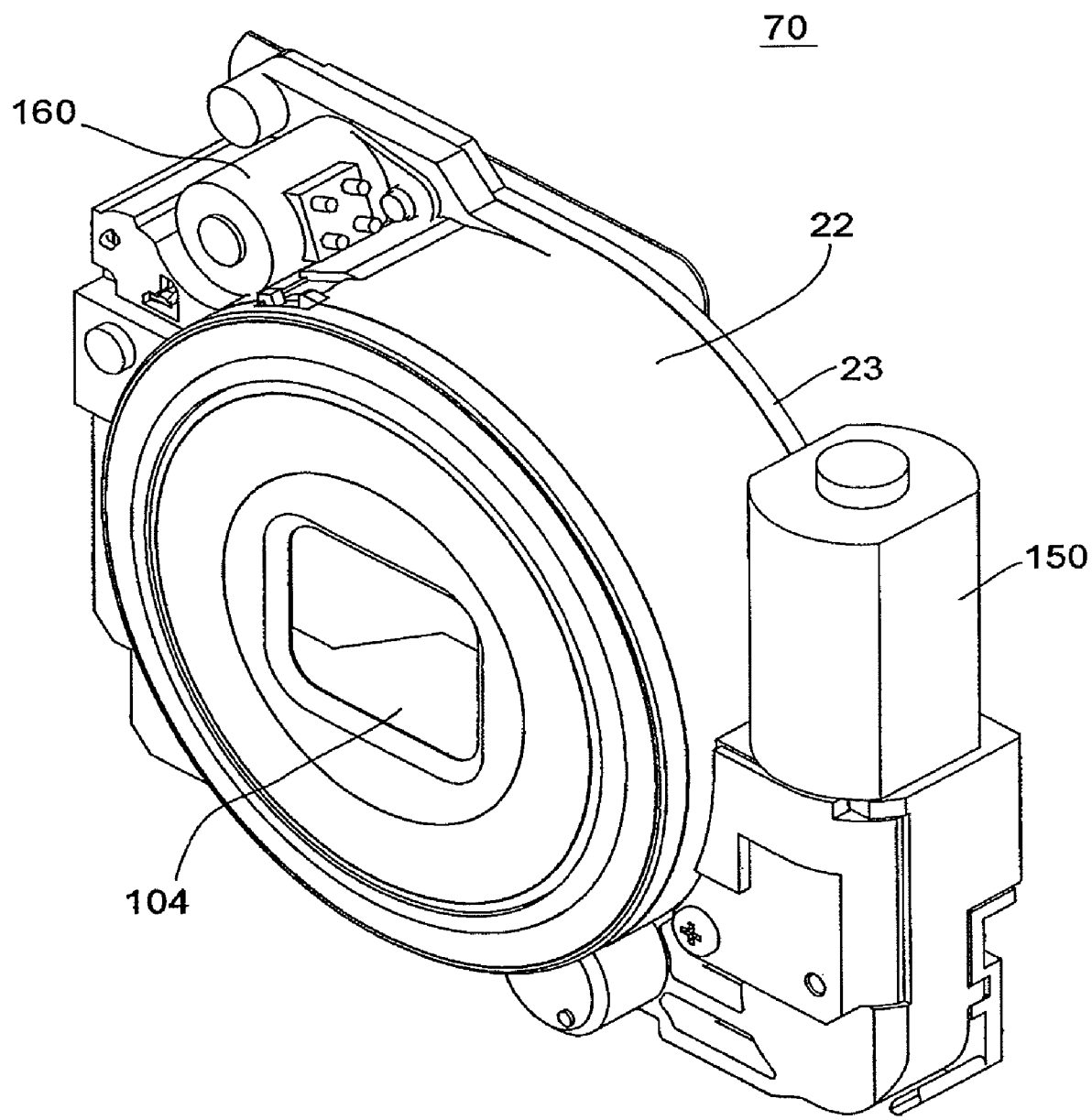
FIG. 1 is a perspective external view of a zoom lens barrel (zoom lens unit) according to the present invention, showing the zoom lens barrel in a lens barrel accommodated state (fully retracted state)
Figure 2:
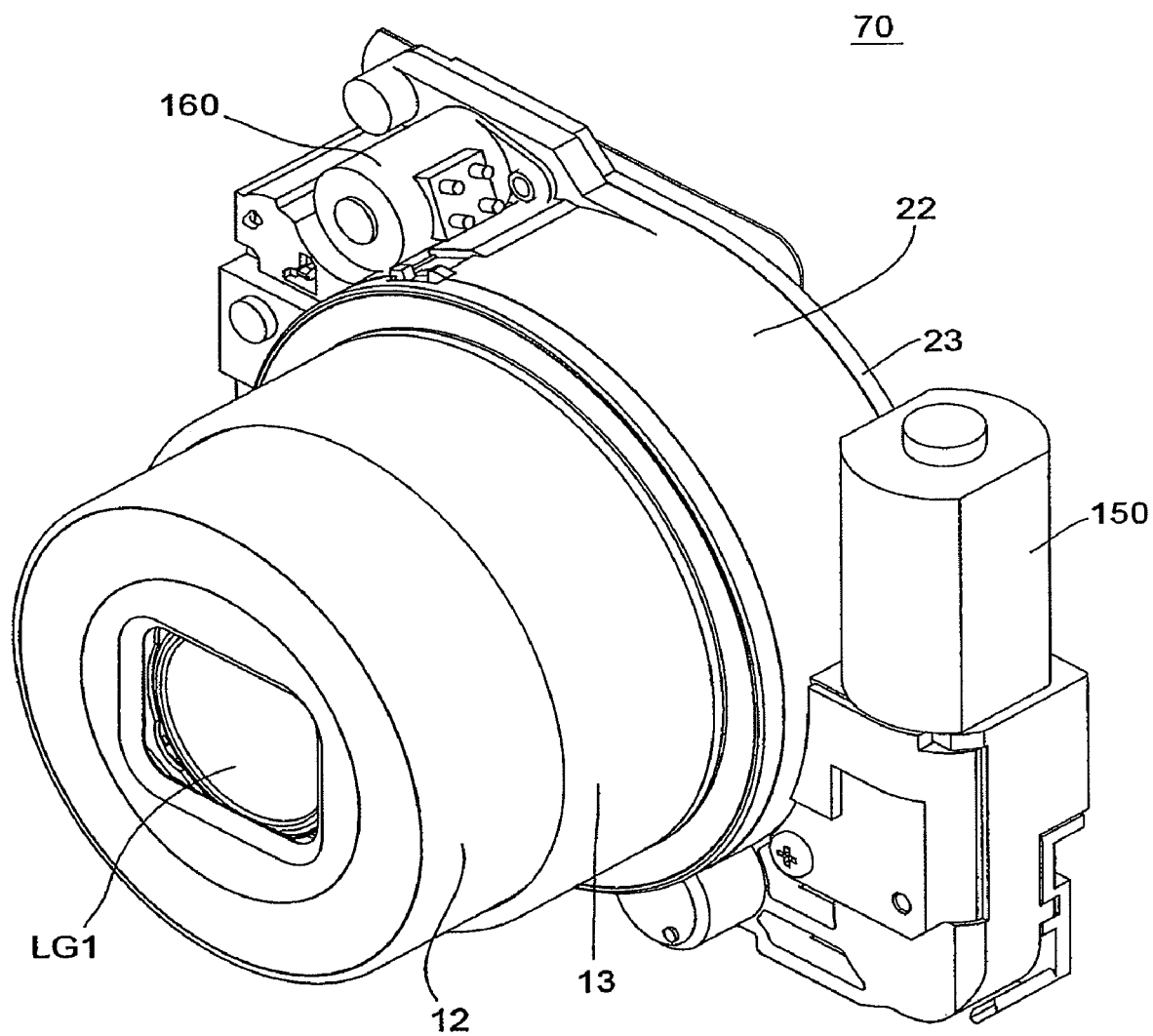
FIG. 2 is a perspective external view of the zoom lens barrel in a ready-to-photograph state.

The brief description of the structure of a zoom lens barrel 70 according to the present invention will be hereinafter discussed with reference to FIGS. 1 through 4. A photographing optical system of the zoom lens barrel 70 is provided with a first lens group LG1, a second lens group LG2, a set of shutter blades (light quantity control component) S that also serves as a set of diaphragm blades, a third lens group (focusing lens group) LG3, a low-pass filter (optical filter) 25 and an image sensor 71, in that order from the object side. In the following descriptions, the optical axis direction refers to a direction along or parallel to the photographing optical axis O of this photographing optical system.

The low-pass filter 25 and the image sensor 71 are integrated as a single unit and this unit is fixed to an image sensor holder (rear member) 23, and the image sensor holder 23 is fixed to the back of a housing 22 of the zoom lens barrel 70. A zoom motor 150 and an AF motor 160 are supported by the housing 22 on the outside thereof.

A third lens group frame (rear holding member) 51 which supports the third lens group LG3 is supported by the housing 22 to be movable in the optical axis direction relative to the housing 22. The third lens group frame 51 is driven by the AF motor 160.

Figure 3:
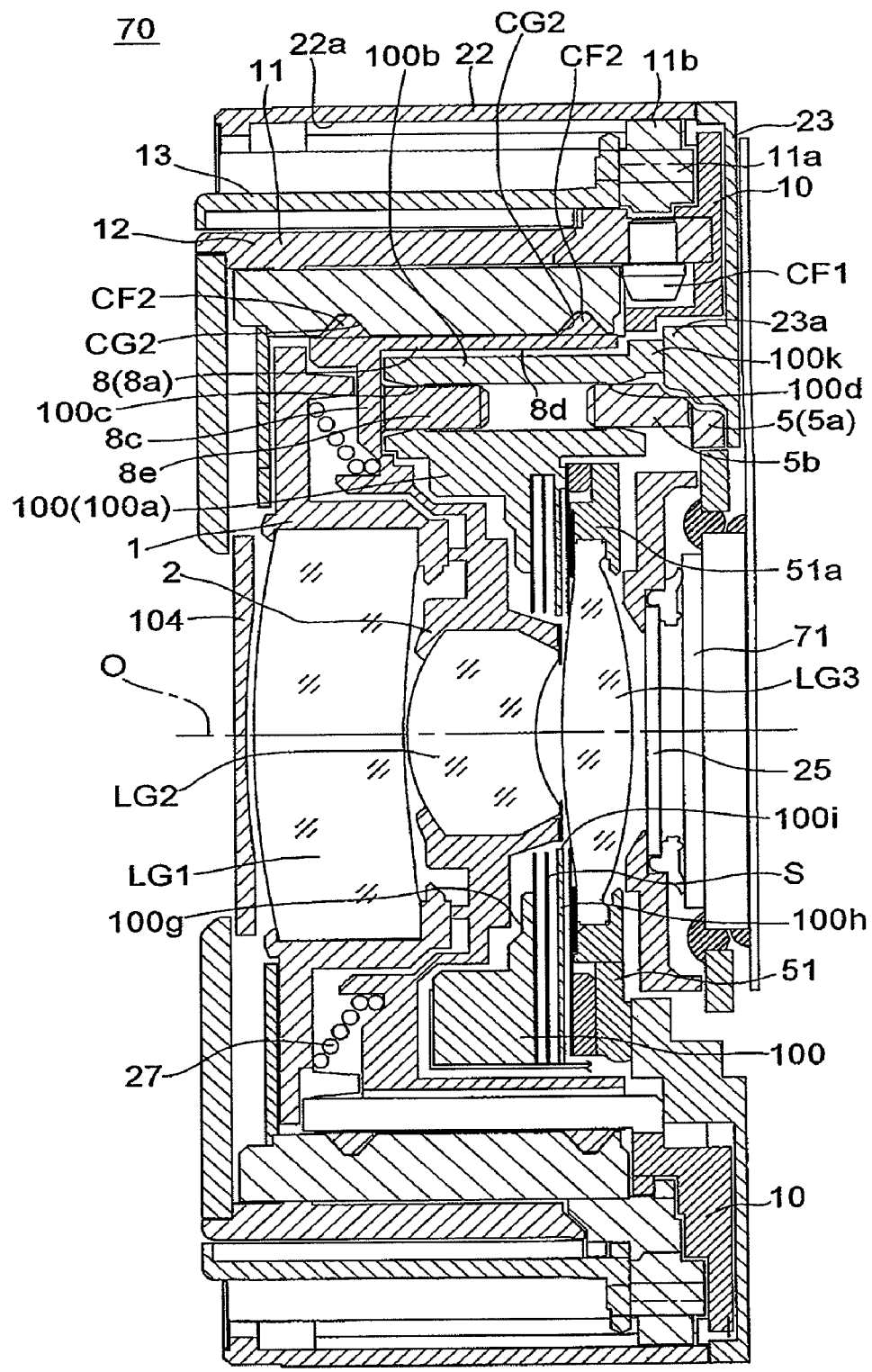
FIG. 3 is a cross sectional view of the zoom lens barrel in the lens barrel accommodated state.
Figure 4:
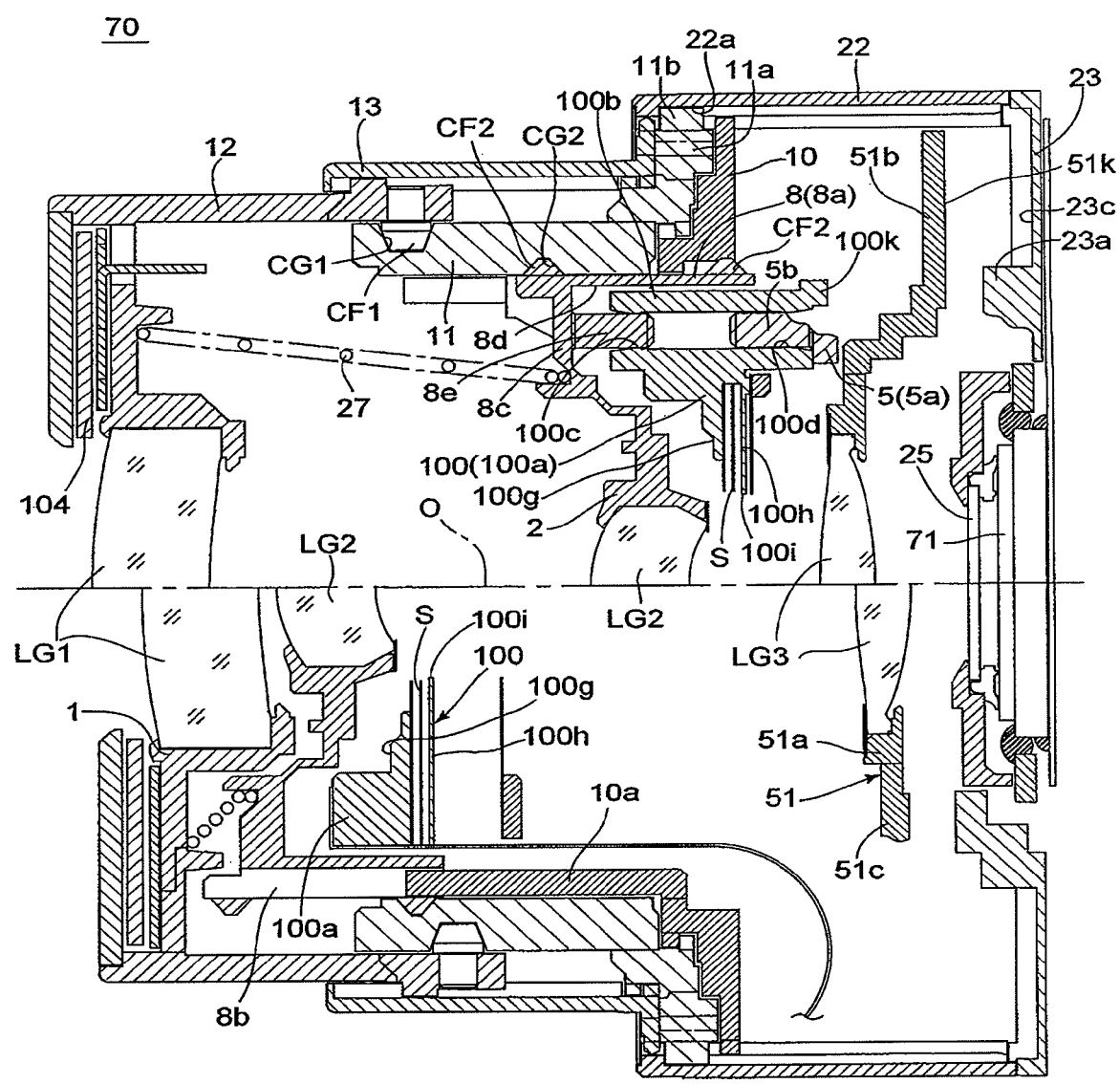
FIG. 4 is a cross sectional view of the zoom lens barrel in a ready-to-photograph state, wherein the upper half and the lower half of the zoom lens barrel shown in FIG. 4 show the zoom lens barrel set at the wide-angle extremity and the telephoto extremity, respectively.

The zoom lens barrel 70 is provided inside the housing with a cam ring 11 which is supported by the housing 22. The cam ring 11 is rotated by the driving force of the zoom motor 150. The cam ring 11 moves in the optical axis direction while rotating about the photographing optical axis O until reaching a ready-to-photograph state (the wide-angle extremity shown in the upper half of FIG. 4) from the lens barrel accommodated state (shown in FIG. 3), and the cam ring 11 rotates at a fixed position in the optical axis direction when the zoom lens barrel 70 is in the zooming range (between the wide-angle extremity shown in the upper half of FIG. 4 and the telephoto extremity shown in the lower half of FIG. 4) in a ready-to-photograph state. More specifically, as shown in FIGS. 3 and 4, the cam ring 11 is provided at the rear end thereof in the optical axis direction with an annular gear 11a, and is provided on the annular gear 11a with a plurality of guide projections 11b. The annular gear 11a is in mesh with a zoom gear 28 (see FIGS. 6 and 7) which is rotated by the zoom motor 150. The set of three guide projections 11b are engaged in a corresponding plurality of cam ring guide grooves 22a formed on an inner peripheral surface of the housing 22, respectively. Each cam ring guide groove 22a is provided at the front thereof with an annular (circumferential) groove portion having its center on the photographing optical axis O and a helical groove portion which extends rearwardly from the annular groove portion (see FIGS. 6 and 7). When the zoom lens barrel 70 is in between the lens barrel accommodated state and a ready-photograph state (at the wide-angle extremity), the cam ring 11 moves in the optical axis while rotating while each guide projection 11b is guided by the helical groove portion of the associated cam ring guide groove 22a. Specifically, when the zoom lens barrel 70 moves from the lens barrel accommodated state to a ready-to-photograph state, the cam ring 11 moves forward (toward the object side) in the optical axis direction while rotating. Conversely, when the zoom lens barrel 70 moves from a ready-to-photograph state to the lens barrel accommodated state, the cam ring 11 moves rearward in the optical axis direction while rotating. In addition, when the zoom lens barrel 70 is in the zooming range from the wide-angle extremity to the telephoto extremity, the cam ring 11 is rotated at a fixed position in the optical axis direction (i.e., without changing the position of the cam ring 11 in the optical axis direction relative to the housing 22) while each guide projection 11b is guided by the ring-shaped groove portion of the associated cam ring guide groove 22a.

The zoom lens barrel 70 is provided with a first advancing barrel 13 and a linear guide ring 10 which are supported by the housing 22 with the cam ring 11 being positioned between the first advancing barrel 13 and the linear guide ring 10. Each of the first advancing barrel 13 and the linear guide ring 10 is guided linearly in the optical axis direction relative to the housing 22. In addition, each of the first advancing barrel 13 and the linear guide ring 10 is coupled to the cam ring 11 to be rotatable relative to the cam ring 11 and to move with the cam ring 11 in the optical axis direction.

The linear guide ring 10 guides a second lens group moving frame (advancing/retracting member) 8 linearly in the optical axis direction so that the second lens group moving frame 8 can move linearly in the optical axis direction relative to the linear guide ring 10. The second lens group (front lens group) LG2 is positioned inside the second lens group moving frame 8 and supported thereby via a second lens group holding frame 2, and a shutter unit (front holding member) 100 which holds the set of shutter blades S is positioned behind the second lens group LG2 and supported by the second lens group moving frame 8. In addition, the first advancing barrel 13, which is guided linearly in the optical axis direction relative to the housing 22, further guides a second advancing barrel 12 linearly in the optical axis direction so that the second advancing barrel 12 can move linearly in the optical axis direction relative to the first advancing barrel 13. The zoom lens barrel 70 is provided inside the second advancing barrel 12 with a first lens group holding frame 1 which holds the first lens group LG1, so that the second advancing barrel 12 supports the first lens group LG1 via the first lens group holding frame 1.

The second advancing barrel 12 is provided with first cam followers CF1, each of which projects radially inwards, for moving the first lens group LG1. Each first cam follower CF1 slidably engages in an associated first-lens-group control cam groove CG1 formed on an outer peripheral surface of the cam ring 11. Since the second advancing barrel 12 is guided linearly in the optical axis direction via the first advancing barrel 13, a rotation of the cam ring 11 causes the second advancing barrel 12 (i.e., the first lens group LG1) to move in the optical axis direction in a predetermined moving manner in accordance with the contours of the first-lens-group control cam grooves CG1.

The second lens group moving frame 8 is provided on an outer peripheral surface thereof with second cam followers CF2, each of which projects radially outwards. Each second cam follower CF2 slidably engages in an associated second-lens-group control cam groove CG2 formed on an inner peripheral surface of the cam ring 11. Since the second lens group moving frame 8 is guided linearly in the optical axis direction via the linear guide ring 10, a rotation of the cam ring 11 causes the second lens group moving frame 8 (i.e., the second lens group LG2) to move in the optical axis direction in a predetermined moving manner in accordance with the contours of the second-lens-group control cam grooves CG2.

The zoom lens barrel 70 is provided between the second lens group moving frame 8 and the second advancing barrel 12 with an inter-lens-group biasing spring 27 in the form of a compression spring which biases the second lens group moving frame 8 and the second advancing barrel 12 in opposite directions away from each other.

Operations of the zoom lens barrel 70 that has the above described structure will be discussed hereinafter. In the lens barrel accommodated state shown in FIGS. 1 and 3, the length of the optical system in the optical axis direction (the distance from the front surface (object-side surface) of the first lens group LG1 to the imaging surface of the image sensor 71) is shorter than that in a ready-to-photograph state shown in FIGS. 2 and 4. In the lens barrel accommodated state, immediately after a state transitional signal for transition from the lens barrel accommodated state to a ready-to-photograph state (e.g., turning ON a main switch of the camera to which the zoom lens barrel 70 is mounted) is input to the zoom lens barrel 70, the zoom motor 150 is driven in the lens barrel advancing direction, which causes the cam ring 11 to advance in the optical axis direction while rotating. The linear guide ring 10 and the first advancing barrel 13 linearly move with the cam ring 11. Upon the cam ring 11 being rotated, the second lens group moving frame 8, which is guided linearly in the optical axis direction via the linear guide ring 10, is moved in the optical axis direction in a predetermined moving manner inside the cam ring 11 due to the engagement of the second cam followers CF2 with the second-lens-group control cam grooves CG2. Additionally, upon the cam ring 11 being rotated, the second advancing barrel 12, which is guided linearly in the optical axis direction via the first advancing barrel 13, is moved in the optical axis direction in a predetermined moving manner outside the cam ring 11 due to the engagement of the first cam followers CF1 with the first-lens-group control cam grooves CG1.

Namely, the amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 along the photographing optical axis O while changing the air distance therebetween. Driving the zoom motor 150 in a barrel-advancing direction so as to advance the zoom lens barrel 70 from the lens barrel accommodated state firstly causes the zoom lens barrel 70 to move to the wide-angle extremity shown in the upper half of the cross sectional view in FIG. 4, and further driving the zoom motor 150 in the same direction causes the zoom lens barrel 70 to move to the telephoto extremity shown in the lower half of the cross sectional view in FIG. 4. In the zooming range between the telephoto-extremity and the wide-angle extremity, the cam ring 11 rotates at a fixed position as described above, thus not moving either forward or rearward in the optical axis direction. Immediately after a transition signal for transition from a ready-to-photograph state to the lens barrel accommodated state (e.g., for turning OFF the aforementioned main switch of the camera to which the zoom lens barrel 70 is mounted) is input to the zoom lens barrel 70, the zoom motor 150 is driven in the lens barrel retracting direction, which causes the zoom lens barrel 70 to perform a lens barrel retracting operation reverse to the above described lens barrel advancing operation.

The zoom lens barrel 70 is provided at the front end of the second advancing barrel 12 with a pair of barrier blades 104 which opens and shuts the front of the first lens group LG1. The pair of barrier blades 104 is shut in the lens barrel accommodated state, and opened in accordance with the lens barrel advancing operation.

The third lens group frame 51 that supports the third lens group LG3 can be moved forward and rearward in the optical axis direction by the AF motor 160 independently of the above described driving operations of the first lens group LG1 and the second lens group LG2 that are performed by the zoom motor 150. In addition, when the photographing optical system of the zoom lens barrel 70 is in the zooming range from the wide-angle extremity to the telephoto extremity, the third lens group LG3 is moved in the optical axis direction to perform a focusing operation by driving the AF motor 160 in accordance with object distance information obtained by a distance measuring device (not shown) provided, e.g., in the camera to which the zoom lens barrel 70 is mounted.

Figure 7:
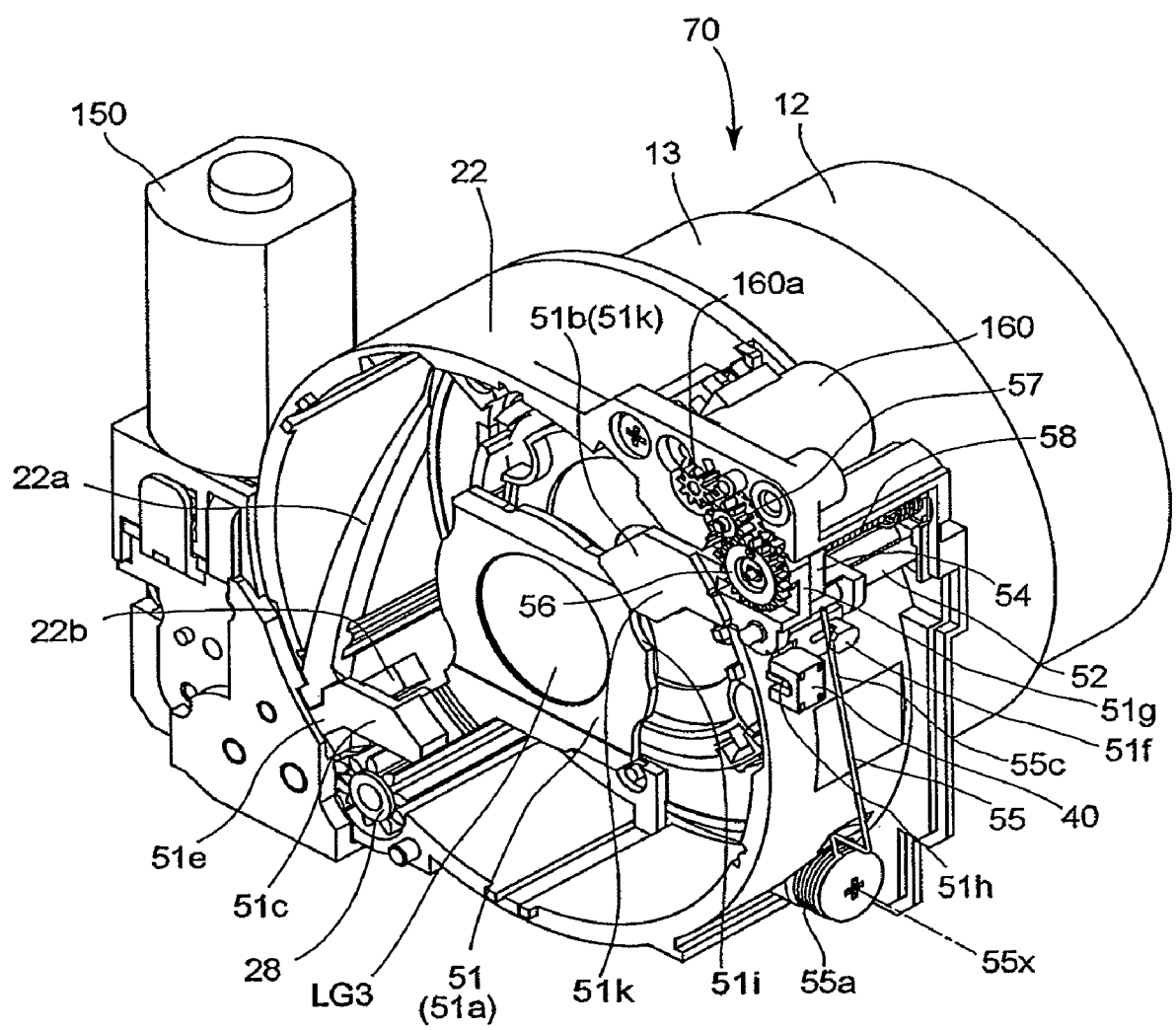
FIG. 7 is a rear perspective view of the zoom lens barrel in a ready-to-photograph state with the image sensor holder of the zoom lens barrel removed.

The zoom lens barrel 70 is provided with a position control mechanism for controlling the position of the third lens group frame 51. The details of this position control mechanism will be discussed hereinafter. As shown in FIG. 7, a pinion 160a fixed on the rotary output shaft of the AF motor 160 projects rearward from a back surface of the housing 22. An intermediate gear 57 which is engaged with the pinion 160a, and a driven gear 56 which is engaged with the intermediate gear 57 are rotatably supported by a back surface of the housing 22. The driven gear 56 is fixed to the rear end of a screw shaft (lead thread) 58 which extends in the optical axis direction. Rotation of the rotary output shaft of the AF motor 160 is transferred to the screw shaft 58 that rotates with the drive gear 56, via the pinion 160a, the intermediate gear 57 and the driven gear 56 which constitute a reduction gear train. The screw shaft 58 is positioned between the housing 22 and the image sensor holder 23 and supported thereby to be rotatable on an axis of rotation substantially parallel to the photographing optical axis O. A lead thread formed on an outer peripheral surface of the screw shaft 58 is screw-engaged with an AF nut (second stopper) 54 which is guided linearly in the optical axis direction. Rotating the screw shaft 58 forward and reverse causes the AF nut 54 to move forward and rearward in a direction parallel to the photographing optical axis O relative to the screw shaft 58 without rotating with the screw shaft 58.

Figure 5:
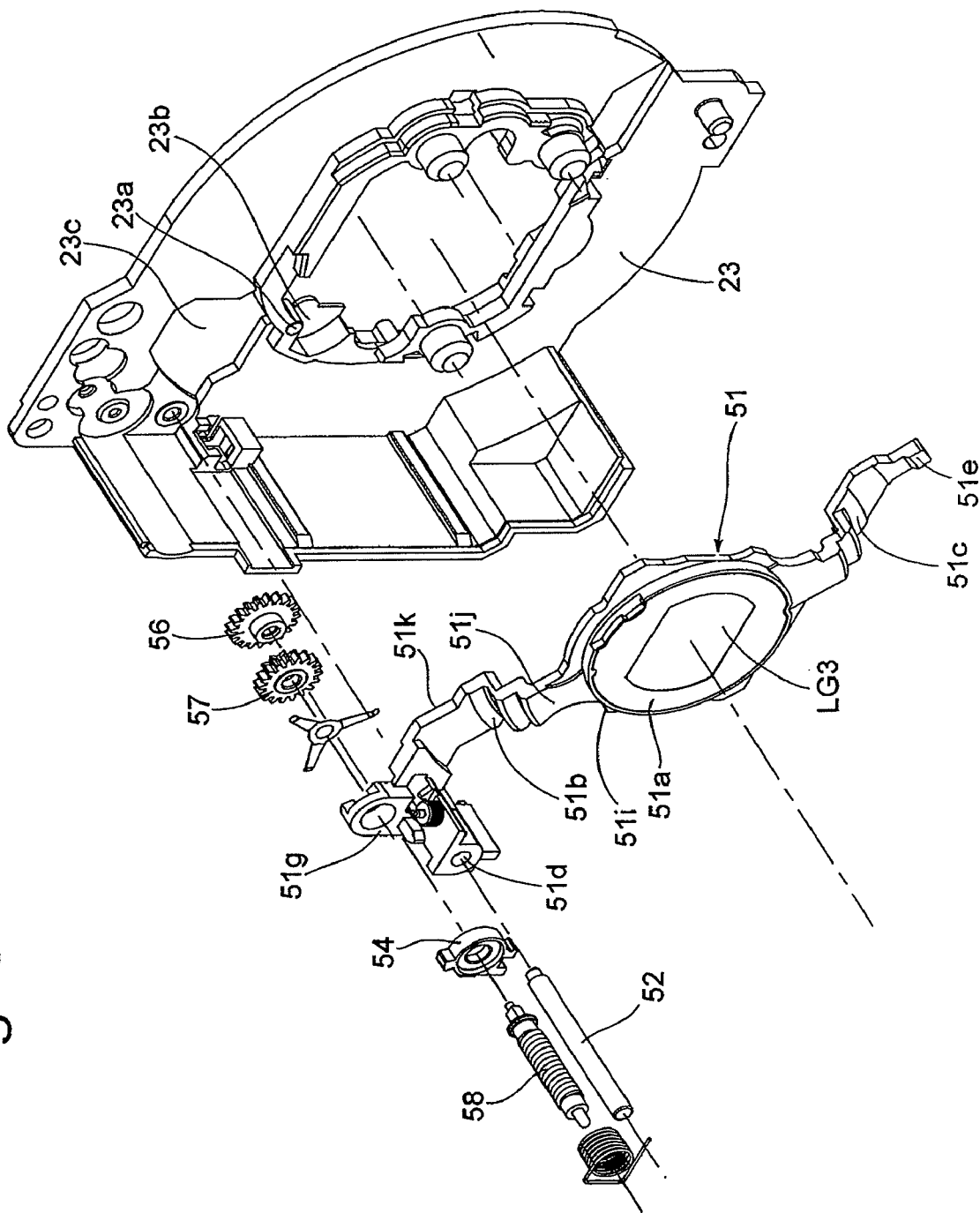
FIG. 5 is an exploded front perspective view of a position control mechanism for the third lens group frame.
Figure 6:
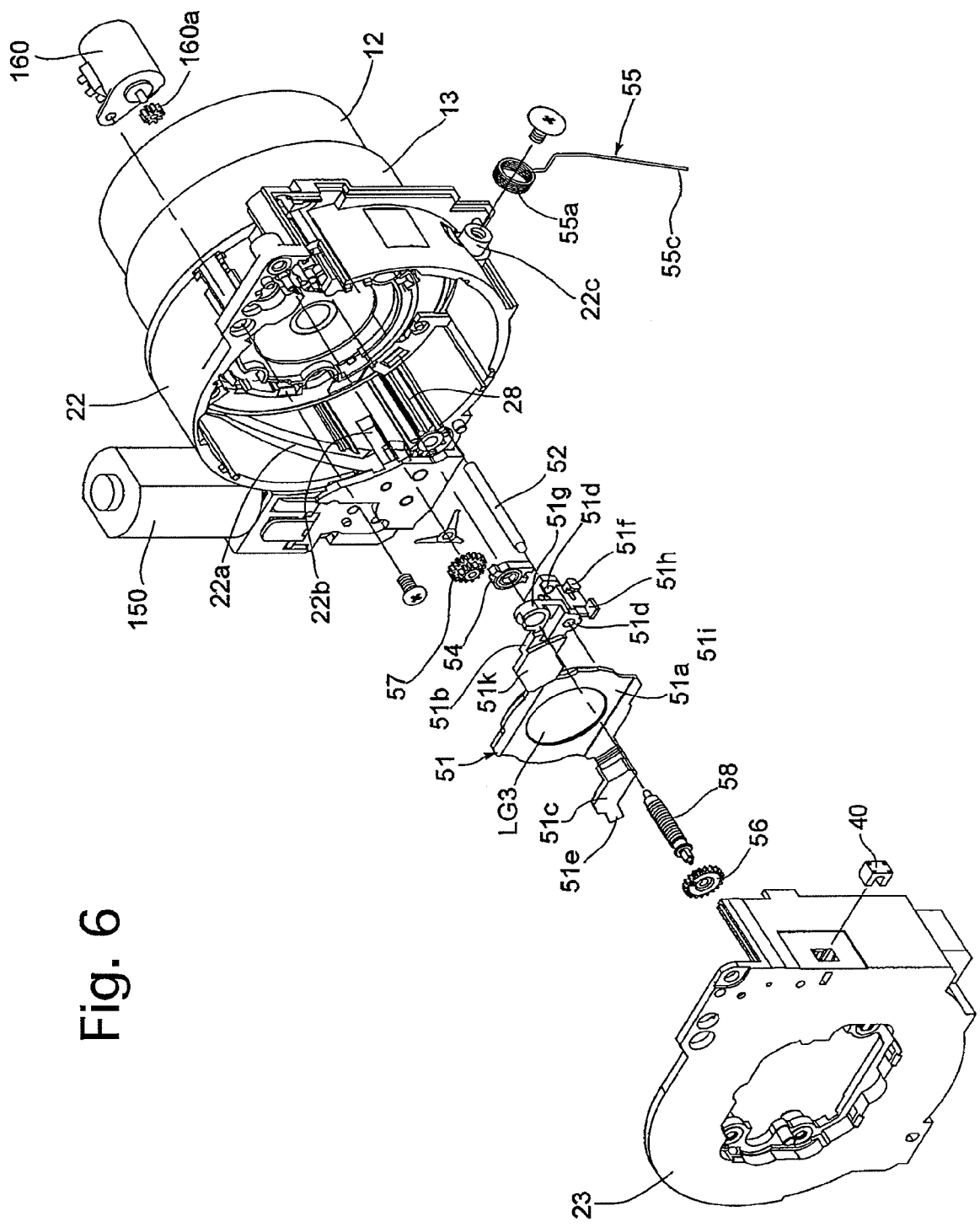
FIG. 6 is an exploded rear perspective view of the position control mechanism for the third lens group frame.

As shown in FIGS. 5 and 6, the third lens group frame 51 is provided with a lens holding portion (optical element holding portion) 51a which holds the third lens group LG3, and is provided with a pair of guide arms (radial arms) 51b and 51c which are formed to extend from the lens holding portion 51a in substantially opposite radial directions symmetrical with respect to the photographing optical axis O. A third lens group guide shaft (an element of a second guide portion) 52 is installed between the housing 22 and the image sensor holder 23 to extend parallel to the photographing optical axis O. The guide arm 51b is provided in the vicinity of the radially outer end thereof with a pair of guide holes (elements of the second guide portion; front and rear guide holes which align in the optical axis direction) 51d (see FIG. 8) into which the third lens group guide shaft 52 is inserted to be freely slidable relative to the pair of guide holes 51d. The third lens group frame 51 is provided at the radially outer end of the other guide arm 51c with an anti-rotation projection 51e, and the housing 22 is provided on an inner peripheral surface thereof with an anti-rotation groove 22b (see FIG. 6) elongated in the optical axis direction in which the anti-rotation projection 51e is engaged to be freely slidable. This engagement between the anti-rotation projection 51e and the anti-rotation groove 22b prevents the third lens group frame 51 from rotating. Accordingly, the third lens group frame 51 is guided in a manner to be capable of moving only linearly in the optical axis direction along the third lens group guide shaft 52.

Figure 8:
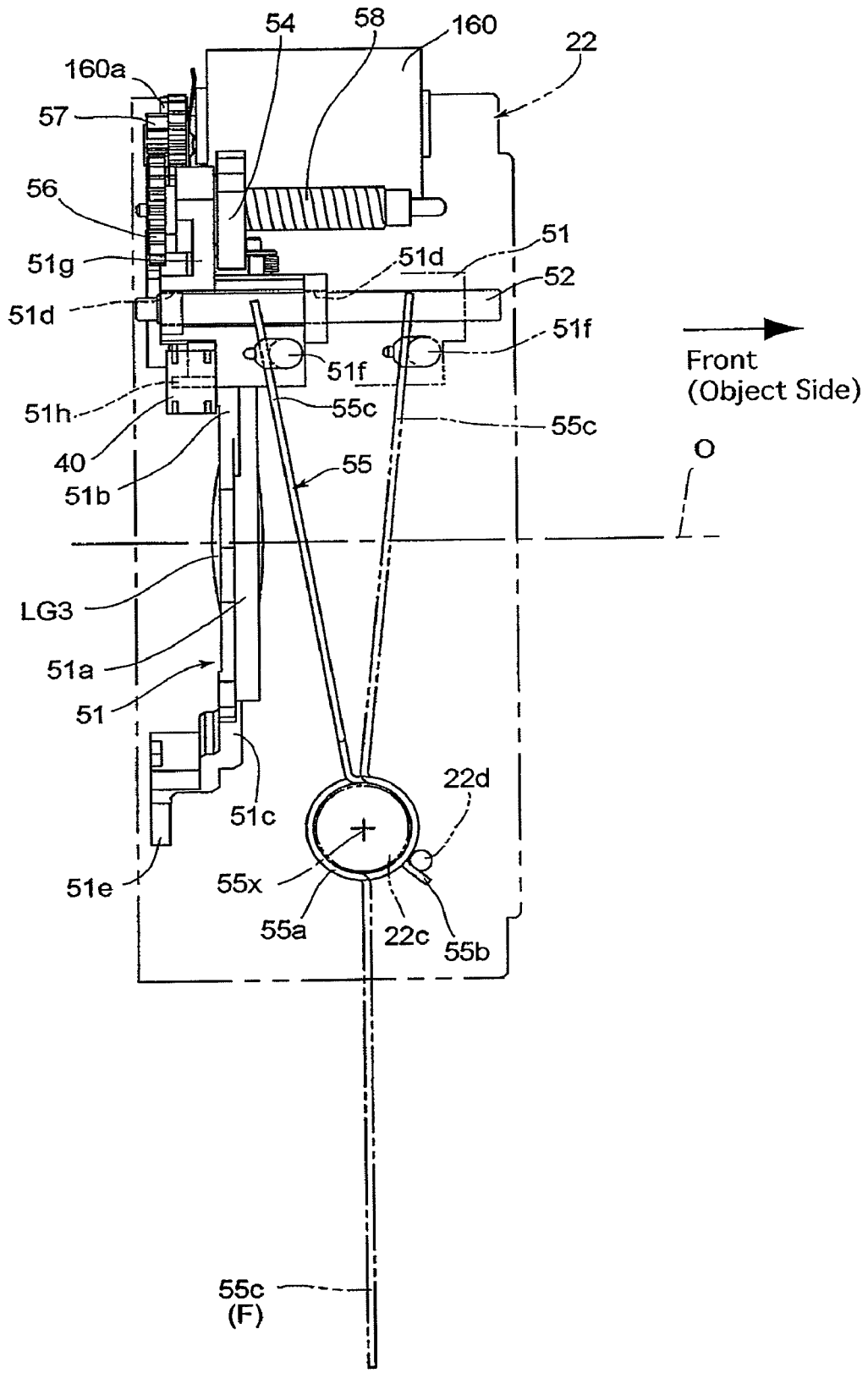
FIG. 8 is a side elevational view of the third lens group frame and the position control mechanism therefor, showing the operation of the torsion spring of the position control mechanism that biases the third lens group frame.

The zoom lens barrel 70 is provided therein on a side of the housing 22 with a torsion spring (second biasing member) 55. As shown in FIG. 8, the torsion spring 55 is provided with a coiled portion 55a, a support arm (short arm) 55b and a biasing arm (long arm) 55c. Each of the support arm 55b and the biasing arm 55c projects radially outwards from the coiled portion 55a. The coiled portion 55a is fitted on a spring support projection 22c formed on the housing 22, while the support arm 55b is hooked onto a spring hook 22d formed on the housing 22 in the vicinity of the spring support projection 22c. The third lens group frame 51 is provided in the vicinity of the rear guide hole 51d with a spring hook 51f on which the biasing arm 55*c* is hooked. The biasing arm 55*c* serves as a force-applied portion capable of swinging about a swing axis 55*x* (fulcrum) which substantially coincides with the axis of the coiled portion 55*a* (and which lies in a plane substantially orthogonal to the photographing optical axis O) (i.e., capable of swinging in a swing plane substantially parallel to the photographing optical axis O). When in a free state where the biasing arm 55*c* is not hooked on the spring hook 51*f*, the biasing arm 55*c* extends vertically downward from the coiled portion 55*a* with respect to FIG. 8 as shown by a two-dot chain line designated by a reference numeral 55*c* (F) in FIG. 8. From this state, by rotating the biasing arm 55*c* by a substantially half rotation counterclockwise with respect to 55*c* (F) of FIG. 8 and hooking a portion of the biasing arm 55*c* at the free end thereof onto the rear surface of the spring hook 51*f* in the optical axis direction, the amount of resilient deformation (twist) of the torsion spring 55 increases, and the resilience of the torsion spring 55 acts as a load on the spring hook 51*f* which makes the biasing arm 55*c* press against the spring hook 51*f* in a direction toward the front of the optical axis direction. Namely, the torsion spring 55 comes into a force-applied state in which a biasing force of the torsion spring 55 toward the front in the optical axis direction is applied to the third lens group frame 51 via the biasing arm 55*c*.

In this manner, the third lens group frame 51, to which a biasing force toward the front in the optical axis direction is applied by the torsion spring 55, is prevented from moving forward by the abutment of a nut abutting portion 51*g* formed in the vicinity of the front guide hole 51*d* (i.e., in the vicinity of the radially outer end of the guide arm 51*b*) against the AF nut 54. Namely, the third lens group frame 51 is held with the nut abutting portion 51*g* being in contact with the AF nut 54 by the biasing force of the torsion spring 55, and the position of the third lens group frame 51 in the optical axis direction is determined according to the AF nut 54. Since the AF nut 54 is moved forward and rearward in the optical axis direction via the screw shaft 58 by rotating the pinion 160*a* of the AF motor 160 forward and reverse as described above, the position of the third lens group frame 51 in the optical axis direction is thus controlled in accordance with the driving direction and the driving amount of the AF motor 160. For instance, if the AF nut 54 is moved forward by the AF motor 160, the third lens group frame 51 follows the forward movement of the AF nut 54 via the biasing force of the torsion spring 55 to move forward by the amount of the forward movement of the AF nut 54. Conversely, if the AF nut 54 is moved rearward from the forward moved position thereof, the AF nut 54 presses the nut abutting portion 51*g* rearward, so that the third lens group frame 51 is moved rearward against the biasing force of the torsion spring 55.

An origin position sensor 40 for detecting the limit of rearward movement of the third lens group frame 51 in the optical axis direction that is moved by the AF motor 160 is installed in the housing 22. The origin position sensor 40 is made of a transmission photo-interrupter which includes a body having a U-shaped cross section with a light emitter and a light receiver which are provided thereon so as to face each other with a predetermined distance therebetween, and it is detected that the third lens group frame 51 is positioned at the limit of rearward movement thereof when a sensor interrupt plate 51*h* formed integral with the third lens group frame 51 passes between the light emitter and the light receiver. The AF motor 160 is a stepping motor. The amount of movement of the third lens group LG3 when a focusing operation is performed is calculated as the number of steps for driving the AF motor 160 with the position of the sensor interrupt plate 51*h* which is detected by the origin position sensor 40 being taken as the point of origin.

Figure 9:
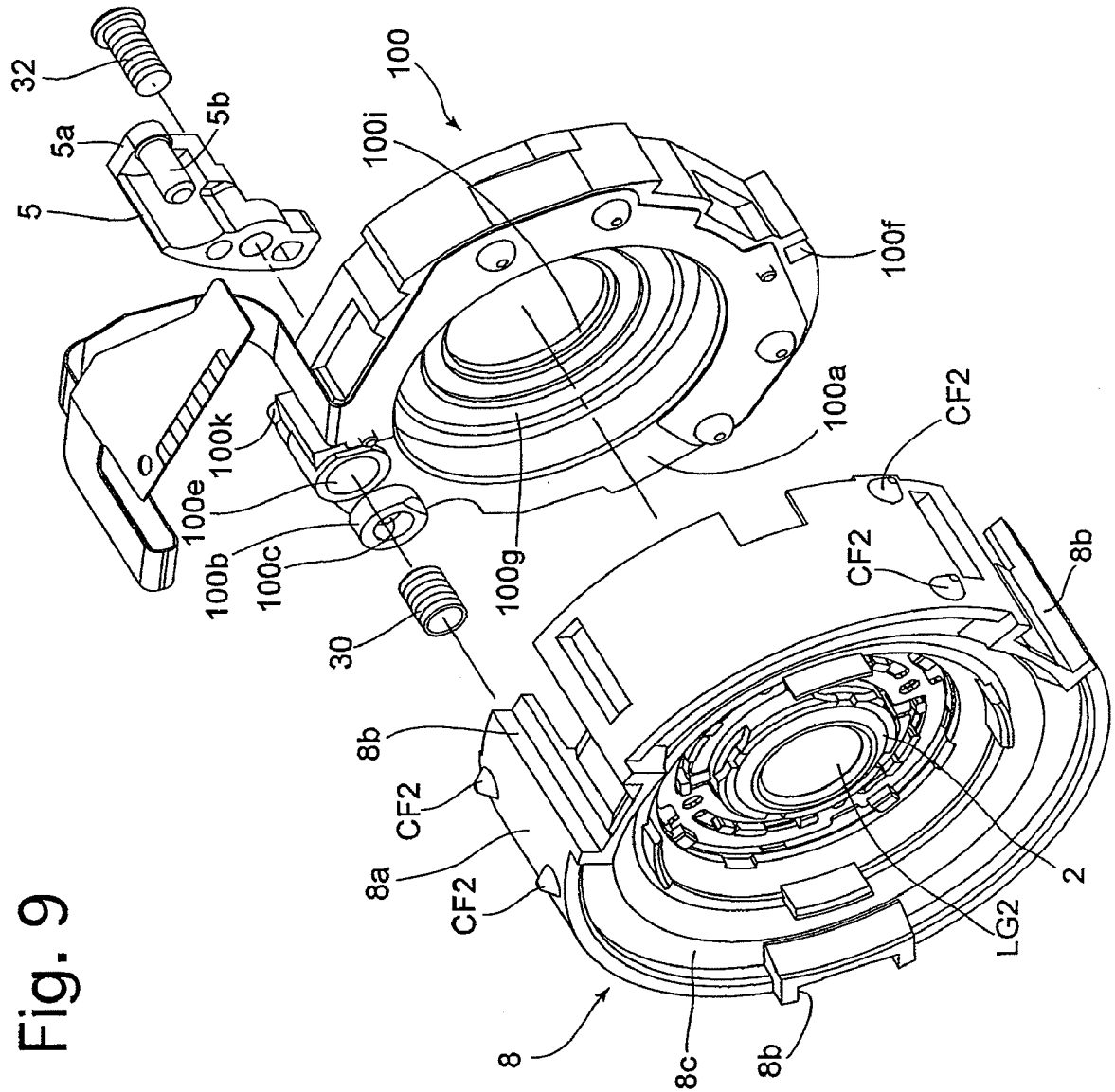
FIG. 9 is an exploded front perspective view of a shutter unit support structure provided by a second lens group moving frame.
Figure 10:
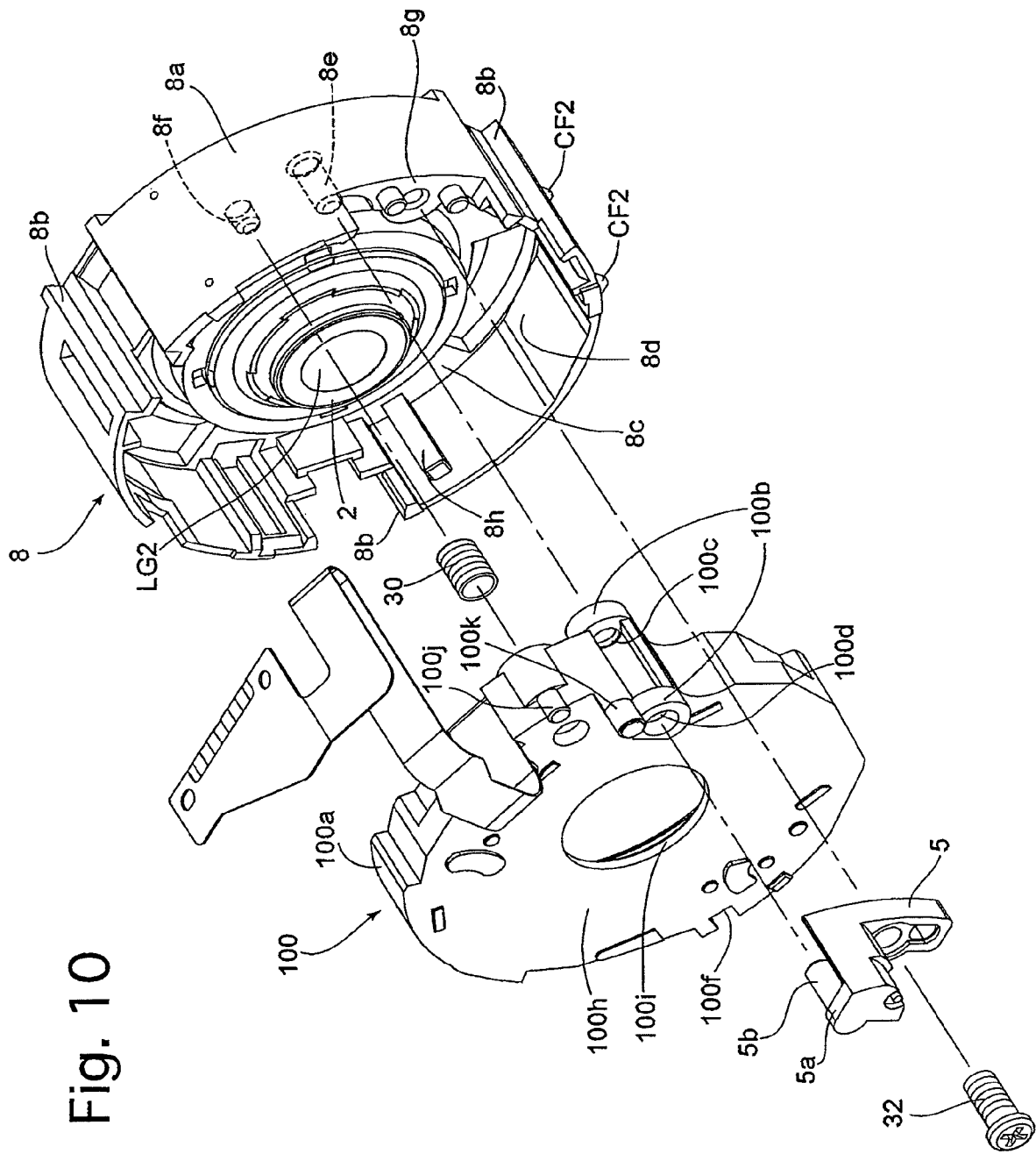
FIG. 10 is an exploded rear perspective view of the shutter unit support structure provided by the second lens group moving frame.

The shutter unit support structure for the shutter unit 100 will be discussed hereinafter. As shown in FIGS. 9 and 10, the second lens group moving frame 8 is provided with a cylindrical portion 8*a* having second cam followers CF2 which are formed on an outer peripheral surface of the cylindrical portion 8*a*. The second lens group moving frame 8 is guided linearly in the optical axis direction via the engagement between three guide slots 8*b* which are formed through the cylindrical portion 8*a* to be elongated in the optical axis direction and three linear guide keys 10*a* (see FIG. 4) formed on the linear guide ring 10. The second lens group moving frame 8 is provided, on an inner peripheral surface of the cylindrical portion 8*a*, with an inner flange 8*c*, and holds the second lens group LG2 on the radially inside of the inner flange 8*c* via the second lens group holding frame 2. The second lens group moving frame 8 is provided behind the inner flange 8*c* with a shutter unit accommodation space 8*d*. As shown in FIG. 10, the second lens group moving frame 8 is provided, on a rear surface of the inner flange 8*c* which is exposed to the shutter unit accommodation space 8*d*, with a front guide pin (an element of a first guide portion) 8*e* and a spring support pin 8*f* which project rearward in the optical axis direction. A shutter unit biasing spring (first biasing member) 30 in the form of a compression coil spring is fitted on the spring support pin 8*f* to be supported thereby. The second lens group moving frame 8 is provided, on the cylindrical portion 8*a* in the vicinity of the front guide pin 8*e*, with a stopper mounting recess 8*g* that is formed by cutting out part of the cylindrical portion 8*a*. A shutter stopper member (first stopper) 5 is fixed to the stopper mounting recess 8*g* by a set screw 32. The shutter stopper member 5 is provided with a rearward movement limit portion 5*a* which is offset behind the mounting portion of the shutter stopper member 5 in the optical axis direction, that is mounted to the stopper mounting recess 8*g*, so as to face the inner flange 8*c*. The shutter stopper member 5 is provided with a rear guide pin (an element of the first guide portion) 5*b* which projects from the rearward movement limit portion 5*a* toward the front in the optical axis direction. The front guide pin 8*e* and the rear guide pin 5*b* are cylindrical-column-shaped projections, the diameters of which are substantially identical to each other. The front guide pin 8*e* and the rear guide pin 5*b* are coaxial with each other, i.e., aligned with each other in a state where the shutter stopper member 5 is fixed to the second lens group moving frame 8. In this state, the common axis of the front guide pin 8*e* and the rear guide pin 5*b* is substantially parallel to the photographing optical axis O.

The shutter unit 100 is provided with a shutter holding frame 100*a* which supports the set of shutter blades S and an actuator therefor inside the shutter holding frame 100*a*. The shutter unit 100 is provided with a through-sleeve 100*b* having a through-hole extending in the optical axis direction, and is provided, in the vicinity of an outer periphery of the shutter holding frame 100*a* at the front and rear ends of the through-sleeve 100*b*, with a front pin support hole (an element of the first guide portion) 100*c* and a rear pin support hole (an element of the first guide portion) 100*d*, respectively. The front pin support hole 100*c* and the rear pin support hole 100*d* are cylindrical through-holes, the axes of which are parallel to the photographing optical axis O and coaxial with each other. The front pin support hole 100*c* has an inner diameter allowing the front guide pin 8*e* to be slidably inserted into the front pin support hole 100*c* in the axial direction thereof with no play, while the rear pin support hole 100*d* has an inner diameter allowing the rear guide pin 5*b* to be slidably inserted into the rear pin support hole 100*d* in the axial direction thereof with no play. The through-sleeve 100*b* is formed in a partial cylinder, the outer periphery of which is partly missing; however, the inner diameter of the partially cylindrical portion in the middle part of the through-sleeve 100*b* is greater than the inner diameters of the front pin support hole 100*c* and the rear pin support hole 100*d*. The shutter holding frame 100*a* is provided, on the front thereof in the vicinity of the through-sleeve 100*b*, with a spring support hole 100*e* (see FIG. 9) into which the shutter unit biasing spring 30 can be inserted. In addition, the shutter holding frame 100*a* is provided on an outer peripheral surface thereof with an anti-rotation groove 100*f*, and the second lens group moving frame 8 is provided, on an inner peripheral surface thereof in the shutter unit accommodation space 8*d*, with an anti-rotation key 8*h* which is engaged in the anti-rotation groove 100*f* to be slidable therein in the optical axis direction and to be prevented from rotating relative to the anti-rotation groove 100*f*. The shutter holding frame 100*a* is provided on the front thereof with a front recessed portion 100*g* which is shaped to correspond to the inner flange 8*c* of the second lens group moving frame 8. In addition, the shutter holding frame 100*a* is provided on the rear thereof with a rear cover plate 100*h* which covers the rear end of the set of shutter blades S (when the set of shutter blades S are in an opened position). The rear cover plate 100*h* is provided at a center thereof with a circular shutter opening 100*i* which is opened and shut by the set of shutter blades S.

The shutter unit 100 is mounted to the second lens group moving frame 8 in a manner which will be discussed hereinafter. Firstly, the shutter unit 100 is inserted into the shutter unit accommodation space 8*d* with the shutter unit biasing spring 30 being supported by the spring support pin 8*f*. Inserting the shutter unit 100 into the shutter unit accommodation space 8*d* in a direction to approach the inner flange 8*c* (i.e., in the forward direction) from the rear end side of the second lens group moving frame 8 with the anti-rotation key 8*h* being aligned with the anti-rotation groove 100*f* causes the front guide pin 8*e* to be inserted into the front pin support hole 100*c* and simultaneously causes the shutter unit biasing spring 30 to be inserted into the spring support hole 100*e*.

Subsequently, the shutter stopper member 5 is installed in the stopper mounting recess 8*g*. The rear guide pin 5*b* is inserted into the rear pin support hole 100*d* of the shutter unit 100 according to installation of the shutter stopper member 5 to the stopper mounting recess 8*g*. Thereafter, by fixing the shutter stopper member 5 to the second lens group moving frame 8 by the set screw 32, the shutter unit 100 is positioned between the inner flange 8*c* of the second lens group moving frame 8 and the rearward movement limit portion 5*a* of the shutter stopper member 5 and held in the shutter unit accommodation space 8*d*.

In a state where the shutter unit 100 is mounted to the second lens group moving frame 8, the shutter unit 100 is supported by the second lens group moving frame 8 to be movable in the optical axis direction relative to the second lens group moving frame 8 and the shutter stopper member 5 by the slidable engagement of the front pin support hole 100*c* with the front guide pin 8*e* and the slidable engagement of the rear pin support hole 100*d* with the rear guide pin 5*b*. By the engagement of the anti-rotation key 8*h* with the anti-rotation groove 100*f*, the shutter unit 100 is prevented from rotating relative to the second lens group moving frame 8, and the shutter unit 100 is guided so as to be capable of moving only linearly in the optical axis direction. As shown in FIGS. 3 and 4, the length of the through-sleeve 100*b* in the shutter unit 100 in the optical axis direction is smaller than the spacing (length) between the inner flange 8*c* and the rearward movement limit portion 5*a* in the optical axis direction, and the shutter unit 100 is movable in the moving range between the limit of forward movement determined by the inner flange 8*c* and the limit of rearward movement determined by the rearward movement limit portion 5*a*. Although the rear end of the front guide pin 8*e* and the front end of the rear guide pin 5*b* are spaced apart from each other in the optical axis direction, the axial lengths of the guide pins 8*e* and 5*b* and the formation positions of the pin support holes 100*c* and 100*d* are determined so that the front guide pin 8*e* and the rear guide pin 5*b* do not come out of the front pin support hole 100*c* and the rear pin support hole 100*d*, respectively, within the range of movement of the shutter unit 100 between the front and rear moving limits thereof. In a state where the shutter unit 100 is mounted to the second lens group moving frame 8, the shutter unit biasing spring 30 is in a compressed state, and the shutter unit 100 is continuously biased by the resiliency of the shutter unit biasing spring 30 toward the rear moving limit thereof at which the through-sleeve 100*b* abuts against the rearward movement limit portion 5*a*.

As shown in FIG. 10, the shutter unit 100 is provided with a first rear projection (first contact portion) 100*j* and a second rear projection (second contact portion) 100*k* each of which projects rearward in the optical axis direction. The second rear projection 100*k* is formed in the vicinity of the through-sleeve 100*b*, into which the front guide pin 8*e* and the rear guide pin 5*b* are inserted, and projects rearward beyond each of the rear end of the through-sleeve 100*b* and the rear cover plate 100*h*. The first rear projection 100*j* is formed behind the spring support hole 100*e*, in which the shutter unit biasing spring 30 is inserted, in the optical axis direction, and projects rearward beyond the rear cover plate 100*h*. Each of the first rear projection 100*j* and the second rear projection 100*k* is shaped into a cylindrical column, the rear end surface of which is formed as a flat surface which faces toward the rear in the optical axis direction and lies in a plane substantially orthogonal to the photographing optical axis O.

Figure 11:
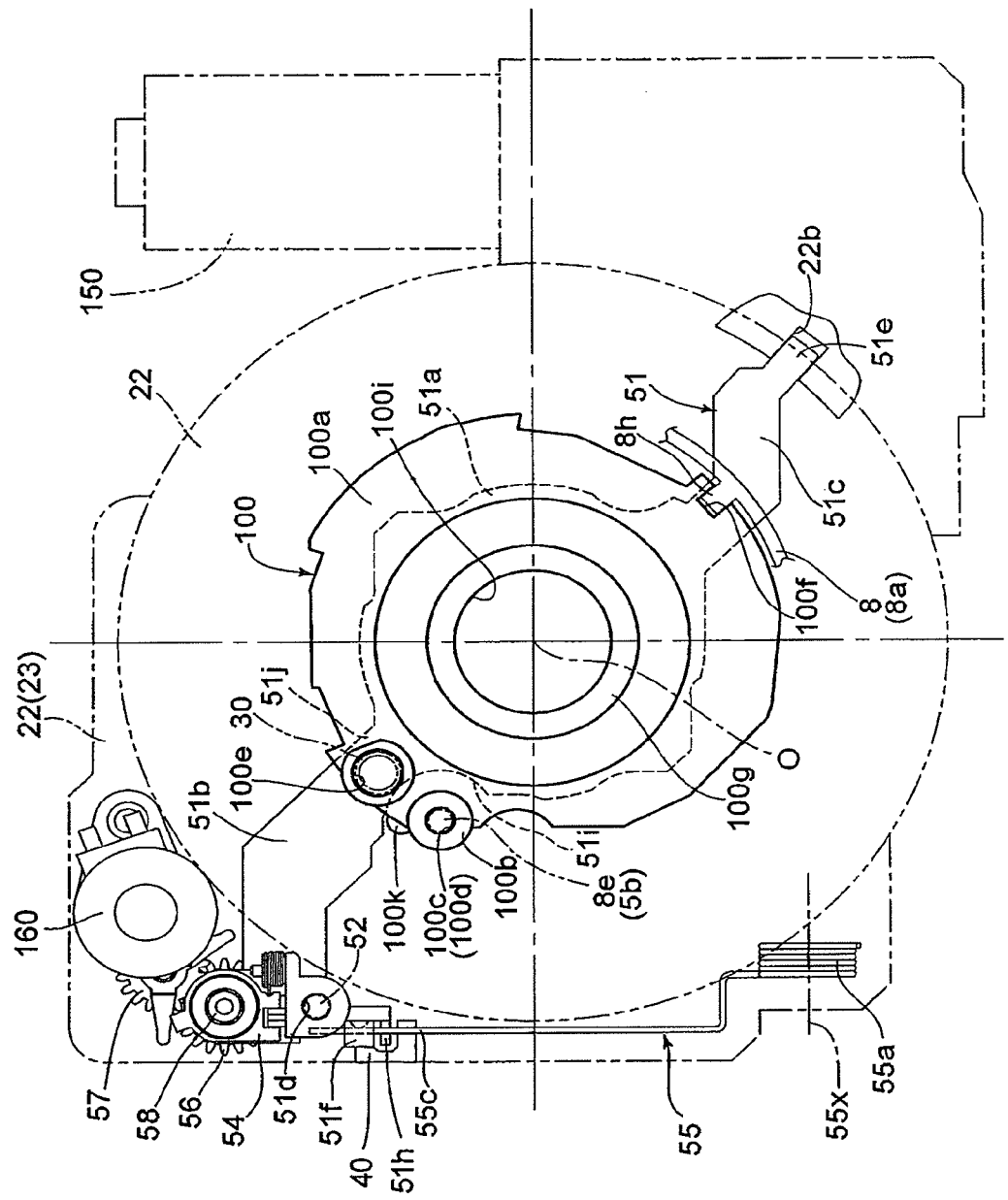
FIG. 11 is a front elevational view of main parts of the zoom lens barrel for illustrating the arrangement of the shutter unit and the shutter unit support structure.
Figure 12:
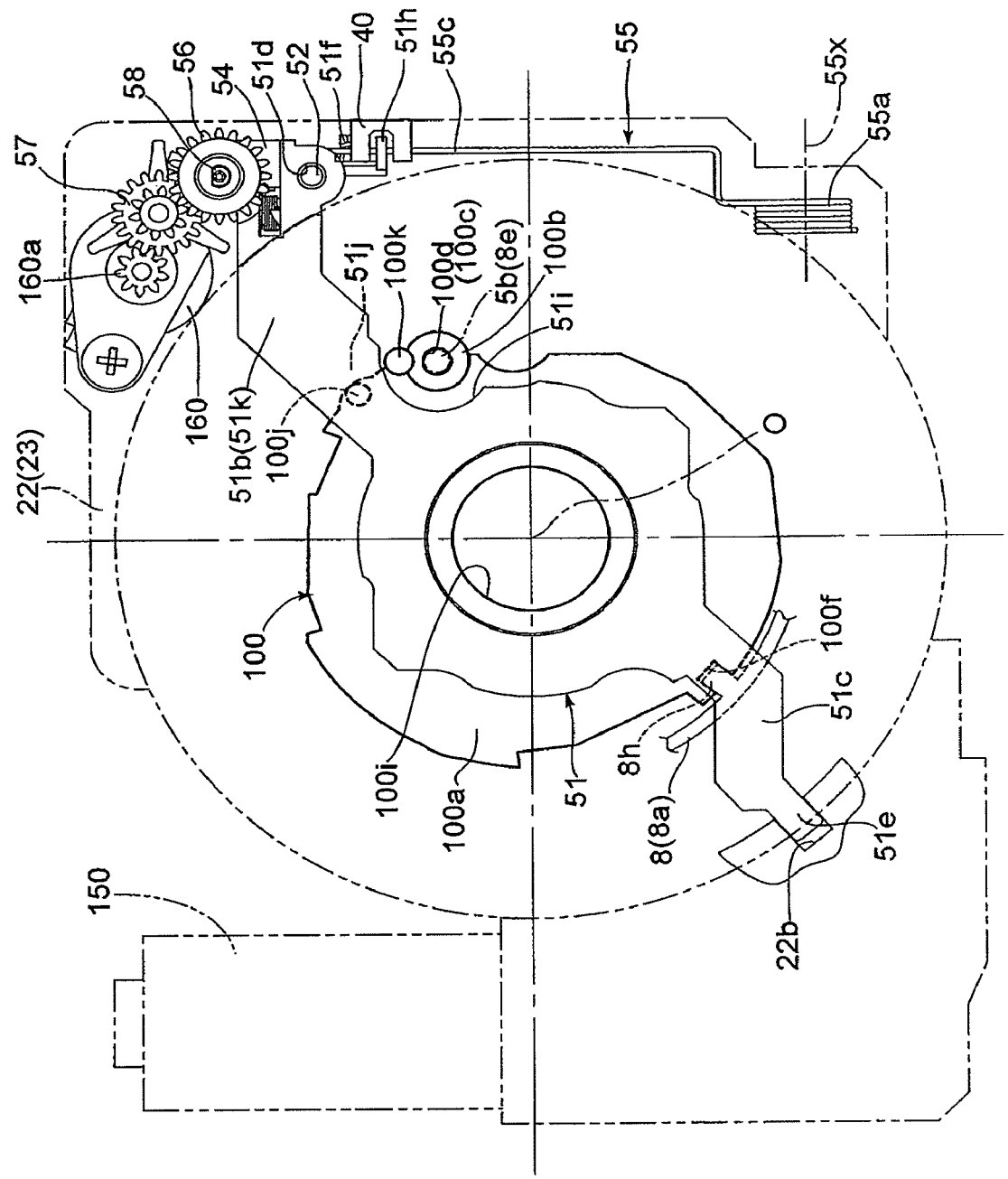
FIG. 12 is a rear elevational view of main parts of the zoom lens barrel for illustrating the arrangement of the shutter unit and the shutter unit support structure.

As shown in FIGS. 11 and 12, the third lens group frame 51 is provided in the vicinity of the boundary between the lens holding portion 51*a* and the guide arm 51*b*, with a semicircular notch 51*i* so that the through sleeve 100*b* and the second rear projection 100*k* of the shutter unit 100 are disposed within the semicircular notch 51*i* when viewed in the optical axis direction. As shown in FIG. 5, the image sensor holder 23 is provided with a front projection (second contact portion) 23*a* and an accommodation recess 23*b* that is disposed inside the cutout 51*i* when viewed in the optical axis directions. The front projection 23*a* is provided with a front end surface which faces toward the front in the optical axis direction and lies in a plane substantially orthogonal to the photographing optical axis O. This front end surface of the front projection 23*a* faces the rear end of the second rear projection 100*k* of the shutter unit 100. The accommodation recess 23*b* is shaped so as to be capable of accommodating the rearward movement limit portion 5*a* of the shutter stopper member 5 that is positioned behind the through sleeve 100*b* of the shutter unit 100. In addition, as shown in FIG. 12, the guide arm 51*b* of the third lens group frame 51 is positioned behind the first rear projection 100*j* of the shutter unit 100 as viewed in the optical axis direction, and is provided with a front abutting surface (first contact portion) 51*j* (see FIG. 5) which faces toward the front in the optical axis direction to face the rear end of the first rear projection 100*j*. The front abutting surface 51*j* is a flat surface which lies in a plane substantially orthogonal to the photographing optical axis O.

When the zoom lens barrel 70 that has the above described structure is in the ready-to-photograph state shown in FIG. 4, the shutter unit 100 is held at the rear moving limit that is located inside the shutter unit accommodation space 8d by the biasing force of the shutter unit biasing spring 30, and the set of shutter blades S is positioned behind the second lens group LG2. When the zoom lens barrel 70 moves from a ready-to-photograph state to the lens barrel accommodated state, the second lens group moving frame 8 is moved rearward in the optical axis direction via the cam ring 11 by the driving force of the zoom motor 150, and the shutter unit 100 that is held inside the shutter unit accommodation space 8d also moves rearward in a similar manner. When the shutter unit 100 moves rearward, the first rear projection 100j abuts against the front abutting surface 51j, and thereafter a rearward moving force of the shutter unit 100 is transmitted to the third lens group frame 51. The third lens group frame 51i s biased forward in the optical axis direction by the torsion spring 55, the position of the third lens group frame 51 in the optical axis direction is determined by the engagement of the third lens group frame 51 with the AF nut 54, and the rearward movement of the third lens group frame 51 in the optical axis direction is simply limited by the biasing force of the torsion spring 55, and accordingly, the third lens group frame 51 is moved rearward with the shutter unit 100 if a rearward moving force greater than the biasing force of the torsion spring 55 is applied to the third lens group frame 51 via the shutter unit 100. The biasing force exerted on the shutter unit 100 in the rearward direction by the shutter unit biasing spring 30 is predetermined to be greater than the biasing force exerted on the third lens group frame 51 in the forward direction by the torsion spring 55, and the third lens group frame 51 comes into a state where it is moved rearward with the shutter unit 100 against the biasing force of the torsion spring 55 upon the first rear projection 100j coming into contact with the front abutting surface 51j (without compressing the shutter unit biasing spring 30).

A further rearward movement of the shutter unit 100 causes the second rear projection 100k of the shutter unit 100 to come into contact with the front projection 23a of the image sensor holder 23 as shown in FIG. 3, and thereupon the shutter unit 100 is prevented from further moving rearward. Since the rearward movement limit portion 5a of the shutter stopper member 5, which is provided behind the second rear projection 100k in the optical axis direction, enters the accommodation recess 23b, the rearward movement limit portion 5a does not prevent the second rear projection 100k and the front projection 23a from coming in contact with each other. Accordingly, the shutter unit 100 is prevented from further moving rearward while the second lens group moving frame 8 continues to move rearward. As a result, the shutter unit 100, which is supported to be movable in the optical axis direction by the engagement between the front guide pin 8e and the front pin support hole 100c and the engagement between the rear guide pin 5b and the rear pin support hole 100d, moves away from the rearward movement limit portion 5a, relatively moving forward further into the shutter unit accommodation space 8d against the biasing force of the shutter unit biasing spring 30 to approach the inner flange 8c. When the zoom lens barrel 70 moves to the lens barrel accommodated state, the shutter unit 100 is moved to a position in the vicinity of the forward movement limit thereof in the shutter unit accommodation space 8d, the front end of the through sleeve 100b is positioned closely to the inner flange 8c, and the inner flange 8c is partly positioned inside the front recessed portion 100g as shown in FIG. 3. In addition, the rear end of the second lens group holding frame 2 enters the shutter opening 100i so that the set of shutter blades S surrounds the outer periphery of the rear end of the second lens group LG2 (i.e., the set of shutter blades S and the rear end of the second lens group LG2 coincide with each other in a plane orthogonal to the photographing optical axis O) as shown in FIG. 3. At this stage, the set of shutter blades S is fully opened by an actuator to be retracted radially outwards beyond the position of the peripheral edge of the shutter opening 100i, thus not interfering with the second lens group LG2. In addition, the third lens group frame 51 that holds the third lens group LG3 is positioned between the shutter unit 100 and the image sensor holder 23, and the third lens group frame 51 is retracted to a position shown in FIG. 3 which is close to the image sensor holder 23 with the rear projection 100j being in contact with the front abutting surface 51j. Furthermore, when the second lens group moving frame 8 reaches the rearward movement limit thereof, the third lens group LG3 enters the shutter unit accommodation space 8d as shown in FIG. 3 to thereby reduce the distance between the second lens group LG2 and the third lens group LG3 in the optical axis direction.

In this manner, when the zoom lens barrel 70 moves from a ready-to-photograph state to the lens barrel accommodated state, the rearward moving force of the second lens group moving frame 8 is transmitted to the third lens group frame 51 via the shutter unit 100 so that the third lens group frame 51 moves with the second lens group moving frame 8, and the relative position of the shutter unit 100 with respect to the second lens group frame 8 in the optical axis direction within the shutter unit accommodation space 8d changes against the biasing force of the shutter unit biasing spring 30. This makes it possible to shorten the accommodation space occupied in the optical axis direction by the optical elements ranging from the second lens group LG2 to the third lens group LG3 via the set of shutter blades S that is positioned therebetween, thus making it possible to achieve a reduction in length of the zoom lens barrel 70.

During this retracting operation of the zoom lens barrel 70, the third lens group guide shaft 52 and the guide hole 51d serve as a device for guiding the third lens group frame 51 in the optical axis direction. In addition, a forward biasing force in the optical axis direction is applied to the third lens group frame 51 by the torsion spring 55, and the spring hook 51f constitutes a force-applied point to which this biasing force is applied. On the other hand, the shutter unit 100 is supported by a combination of the front guide pin 8e and the front pin support hole 100c and a combination of the rear guide pin 5b and the rear pin support hole 100d to be movable in the optical axis direction, and a rearward biasing force in the optical axis direction is applied to the shutter unit 100 by the shutter unit biasing spring 30 with the spring support hole 100e serving as a force-applied point to which the biasing force of the shutter unit biasing spring 30 is applied. The zoom lens barrel 70 is provided with the first rear projection 100j of the shutter unit 100 and the front abutting surface 51j of the third lens group frame 51 as first contact portions (pressing portions) for transmitting the rearward moving force of the second lens group moving frame 8 to the third lens group frame 51 when the zoom lens barrel 70 moves from a ready-to-photograph state (operating state) to the lens barrel accommodated state, and is further provided with the second rear projection 100k of the shutter unit 100 and the front projection 23a of the image sensor holder 23 as second contact portions (pressing portions) for limiting the rearward movement of the shutter unit 100 to make the shutter unit 100 move forward relative to the shutter unit accommodation space 8d therein.

As can be understood from FIGS. 11 and 12, the following portions, i.e., the first guide portion for the shutter unit 100

(i.e., the front and rear guide pins 8e and 5b and the front and rear pin support holes 100c and 100d), the second guide portion for the third lens group frame 51 (i.e., the third lens group guide shaft 52 and the pair of guide holes 51d), the biasing-force-applied portion (first force-applied portion) between the shutter unit biasing spring 30 and the spring support hole 100e at which the shutter unit biasing spring 30 and the spring support hole 100e are in contact with each other, the biasing-force-applied portion (second force-applied portion) between the spring hook 51f and the biasing arm 55 at which the spring hook 51f and the biasing arm 55 are in contact with each other, and contact portions which cause the third lens group frame 51 and the shutter unit 100 to move in the optical axis direction to achieve a reduction in length of the zoom lens barrel 70 by contacting each other when the zoom lens barrel 70 is fully retracted (i.e., the first rear projection 100j and the front contact surface 51j, and the second rear projection 100k and the front projection 23a) are all positioned within an angular range of 90 degrees (equiangular range) about the photographing optical axis O as viewed from the front (or back) along the photographing optical axis O (within the left upper quadrant with respect to FIG. 11 or the right upper quadrant with respect to FIG. 12). This configuration makes it possible to move the third lens group frame 51 and the shutter unit 100 smoothly without causing a tilt in either the third lens group frame 51 or the shutter unit 100. Namely, during the retracting operation of the zoom lens barrel 70 to the fully retracted state (i.e., the lens barrel accommodated state), both the third lens group frame 51 and the shutter unit 100 are moved in a direction against the biasing force of the torsion spring 55 and the shutter unit biasing spring 30 that serve as biasing members, respectively, and this movement is carried out by the third lens group frame 51 and the shutter unit 100 being guided by the first guide portion (the front and rear guide pins 8e and 5b and the front and rear pin support holes 100c and 100d) and the second guide portion (the third lens group guide shaft 52 and the pair of guide holes 51d) with the aforementioned contact portions (i.e., the first rear projection 100j and the front contact surface 51j, and the second rear projection 10k and the front projection 23a) that limit movements of the third lens group frame 51 and the shutter unit 100 in the optical axis direction being utilized as force-receiving points. Therefore, the reduction effect on inclinations/tilting of each of the third lens group frame 51 or the shutter unit 100 with respect to the moving direction thereof (direction parallel to the photographing optical axis O) is enhanced by a greater degree since the biasing-force-applied portions, the force-receiving points (contact portions) which act against the biasing forces, the first guide portion and the second guide portion are positioned closer to one another. Namely, by arranging all of the biasing-force-applied portions, the force-receiving points (contact portions) and the first and second guide portions within the angular range of 90 degrees according to the present embodiment, an advanced reduction of inclination/tilting of each of the third lens group frame 51 and the shutter unit 100 with respect to the moving direction thereof is obtained, so that a smooth and reliable operation of the zoom lens barrel 70 is achieved.

The third lens group frame 51 that is guided in the optical axis direction is prevented from rotating by the engagement of the anti-rotation projection 51e with the anti-rotation groove 22b that is formed on the inner peripheral surface of the housing 22. Likewise, the shutter unit 100 that is guided in the optical axis direction is prevented from rotating by the engagement of the anti-rotation groove 100f with the anti-rotation key 8h. As can be seen from FIGS. 11 and 12, the anti-rotation projection 51e and the anti-rotation groove 22b (which constitute an anti-rotation device) for the third lens group frame 51, and the anti-rotation groove 100f and the anti-rotation key 8h (which constitute an anti-rotation device) for the shutter unit 100 are all positioned within the angular range of 90 degrees (within the right lower quadrant with respect to FIG. 11 or the left lower quadrant with respect to FIG. 12) about the photographing optical axis O which is symmetrically positioned on the opposite side of the photographing optical axis O from the aforementioned angular range of 90 degrees (within the left upper quadrant with respect to FIG. 11 or the right upper quadrant with respect to FIG. 12), within which the aforementioned biasing-force-applied portions, the force-receiving points (contact portions) and the first and second guide portions are all positioned. More specifically, the anti-rotation devices are disposed substantially symmetrical to where the biasing-force-applied portions, the force-receiving points and the first and second guide portions are disposed, with respect to the photographing optical axis O. Arranging the anti-rotation devices in this manner makes it possible to enhance the reduction of the inclination/tilting of each of the third lens group frame 51 and the shutter unit 100.

Although the manner of determining the rear movement limit of the shutter unit 100 by the engagement of the second rear projection 100k of the shutter unit 100 with the front projection 23a of the image sensor holder 23 during the retracting operation of the zoom lens barrel 70 to the fully-retracted state (accommodated state) has been described above, it is possible to limit the rearward movement of the shutter unit 100 indirectly via the third lens group frame 51, and this operating manner (second operating manner) will be discussed hereinafter.

As shown in FIGS. 5 through 7, the guide arm 51b of the third lens group frame 51 is provided with a rear abutting surface (second contact portion) 51k which faces rearwardly in the optical axis direction, and the image sensor holder 23 is provided with a holder-side abutting surface (second contact portion) 23c which faces toward the front in the optical axis direction to face the rear abutting surface 51k. Each of the rear abutting surface 51k and the holder-side abutting surface 23c is a flat surface lying in a plane orthogonal to the photographing optical axis O. Operations of the zoom lens barrel 70 until the first rear projection 100j of the shutter unit 100 presses the third lens group frame 51 rearward following the rearward movement of the second lens group moving frame 8 during the retracting operation of the zoom lens barrel 70 to the fully-retracted state (accommodated state) are the same as those in the above described first operating manner. Thereafter, a rearward movement of the third lens group frame 51 causes the rear abutting surface 51k thereof to come into contact with the holder-side abutting surface 23c of the image sensor holder 23 to thereby prevent the third lens group frame 51 from further moving rearward. Thereupon, the shutter unit 100 is also prevented from moving rearward by the engagement of the first rear projection 100j with the front abutting surface 51j. Even upon the rearward movement of the shutter unit 100 being prevented in this manner, the second lens group moving frame 8 continues to move rearward, and the shutter unit 100 moves away from the rearward movement limit portion 5a, relatively moving forward further into the shutter unit accommodation space 8d against the biasing force of the shutter unit biasing spring 30. As a result, similar to the first operating manner, when the zoom lens barrel 70 moves to the lens barrel accommodated state, the shutter unit 100 is moved to a position in the vicinity of the forward movement limit thereof in the shutter unit accommodation space 8*d*, and the set of shutter blades S surrounds the outer periphery of the rear end of the second lens group LG2 (i.e., the set of shutter blades S and the rear end of the second lens group LG2 coincide with each other in a plane orthogonal to the photographing optical axis O), as shown in FIG. 3. Additionally, the third lens group LG3 enters the shutter unit accommodation space 8*d* from behind to thereby reduce the distance between the second lens group LG2 and the third lens group LG3 in the optical axis direction. Accordingly, a reduction in length of the zoom lens barrel 70 is achieved.

As described above, in the second operating manner, the rearward movement of the shutter unit 100 relative to the image sensor holder 23 is limited indirectly via the third lens group frame 51. In addition, similar to the second rear projection 100*k* of the shutter unit 100 and the front projection 23*a* of the image sensor holder 23 in the first operating manner, the rear abutting surface 51*k* and the holder-side abutting surface 23*c*, which are formed between the third lens group frame 51 and the image sensor holder 23 as contact portions (second contact portions) for limiting the rearward movement of the shutter unit 100, are positioned within an angular range of 90 degrees about the photographing optical axis O as viewed from the front along the photographing optical axis O (within the left upper quadrant with respect to FIG. 11 or the right upper quadrant with respect to FIG. 12) together with the following portions: the first guide portion for the shutter unit 100 (i.e., the front and rear guide pins 8*e* and 5*b* and the front and rear pin support holes 100*c* and 100*d*), the second guide portion for the third lens group frame 51 (i.e., the third lens group guide shaft 52 and the pair of guide holes 51*d*), the biasing-force-applied portion (between the spring hook 51*f* and the biasing arm 55 at which the spring hook 51*f* and the biasing arm 55 are in contact with each other), the biasing-force-applied portion (between the shutter unit biasing spring 30 and the spring support hole 100*e* at which the shutter unit biasing spring 30 and the spring support hole 100*e* are in contact with each other), and the contact portions (first contact portions) between the shutter unit 100 and the third lens group frame 51 (i.e., the first rear projection 100*j* and the front contact surface 51*j*). Therefore, similar to the case of the first operating manner, the third lens group frame 51 and the shutter unit 100 can be prevented from inclining/tilting, which makes it possible to achieve a smooth operation of the zoom lens barrel 70.

The above described first and second operating manners can be selectively employed. In the case where the first operating manner is selected, it is desirable that the zoom lens barrel 70 be designed to make the third lens group frame 51 and the image sensor holder 23 (the rear abutting surface 51*k* and the holder-side abutting surface 23*c*) not come in contact with each other so as not to prevent the shutter unit 100 and the image sensor holder 23 (the second rear projection 100*k* and the front projection 23*a*) from coming in contact with each other. Conversely, in the case where the second operating manner is selected, it is desirable that the zoom lens barrel 70 be designed to make the shutter unit 100 and the image sensor holder 23 (the second rear projection 100*k* and the front projection 23*a*) not come in contact with each other so as not to prevent the third lens group frame 51 and the image sensor holder 23 (the rear abutting surface 51*k* and the holder-side abutting surface 23*c*) from coming in contact with each other.

The zoom lens barrel 70 is provided, as the contact portions (the second contact portions) that limit the rearward movement of the shutter unit 100 during the retracting operation of the zoom lens barrel 70, with the second rear projection 100*k* and the front projection 23*a* in the first operating manner or the rear abutting surface 51*k* and the holder-side abutting surface 23*c* in the second operating manner, and these elements which constitute the second contact portions are disposed with other elements within the aforementioned angular range of 90 degrees. However, regarding the device which causes the shutter unit 100 to move relative to the second lens group moving frame 8 in the optical axis direction, it is possible to make the arrangement and the structure of this device different from those in the above described embodiment of the zoom lens barrel 70. For instance, due to the image sensor holder 23, which ultimately limits the rear movement of the shutter unit 100 by the front projection 23*a* or the holder-side abutting surface 23*c*, being a stationary member fixed to the housing 22, the bearing strength of the image sensor holder 23 on the shutter unit 100 is high even if the position of contact of the image sensor holder 23 with the shutter unit 100 or the third lens group moving frame 51 deviates from the aforementioned angular range of 90 degrees, and the shutter unit 100 does not easily tilt relative to the second lens group moving frame 8 when the shutter unit 100 moves relative to the second lens group moving frame 8 in the optical axis direction. Furthermore, it is possible for a portion which causes the shutter unit 100 to move relative to the second lens group moving frame 8 during the retracting operation of the zoom lens barrel 70, i.e., a portion which limits the rearward movement of the shutter unit 100, to be formed on a member other than the image sensor holder 23 and the third lens group frame 51. In other words, the present invention is achieved so long as at least the following five elements are positioned within the aforementioned angular range of 90 degrees, namely, the first guide portion for the shutter unit 100 (i.e., the front and rear guide pins 8*e* and 5*b* and the front and rear pin support holes 100*c* and 100*d*), the second guide portion for the third lens group frame 51 (i.e., the third lens group guide shaft 52 and the pair of guide holes 51*d*), the biasing-force-applied portion for the third lens group moving frame 51 (i.e., the portion at which the spring hook 51*f* and the biasing arm 55*c* are in contact with each other), the biasing-force-applied portion for the shutter unit 100 (i.e., the portion at which the shutter unit biasing spring 30 and the spring support hole 100*e* are in contact with each other), and the contact portions (first contact portions) between the third lens group frame 51 and the shutter unit 100 (i.e., the first rear projection 100*j* and the front contact surface 51*j*). However, in regard to the contact portions (second contact portions) which constitute an additional element provided between the image sensor holder 23 and the shutter unit 100 or the third lens group frame 51, it is desirable for these contact portions (second contact portions) to be positioned within the aforementioned angular range of 90 degrees, like the second rear projection 100*k* and the front projection 23*a*, or the rear abutting surface 51*k* and the holder-side abutting surface 23*c*.

Although the present invention has been discussed with reference to the above described embodiment, the present invention is not limited solely to these particular embodiments. For instance, although the portions of the third lens group frame 51 and the shutter unit 100 which are related to control of the movement of the third lens group frame 51 and the shutter unit 100 (i.e., the first guide portion, the second guide portion, the biasing-force-applied portions and the contact portions) are positioned within one of the four angular ranges about the photographing optical axis O which are equally divided into four by horizontal and vertical lines as shown in FIGS. 11 and 12, the angular range of 90 degrees within which such control-related portions are positioned can be freely set at any angular position as viewed from the front along the photographing optical axis O.

Although the above described embodiment is an example applied to the shutter unit 100 (which holds the set of shutter blades S) and the third lens group frame 51 (which holds the third lens group LG3), the front and rear optical elements respectively held by the front and rear holding members can be optical elements different from the set of shutter blades S and the third lens group LG3. For instance, a light quantity control component by which the set of shutter blades S can be replaced can be a set of diaphragm blades or an ND filter.

Although the image sensor holder 23 serves as a member which limits the rearward movement of the shutter unit 100 in the above illustrated embodiment, such a member which limits the rearward movement of the front holding member is not limited solely to a stationary member such as the image sensor holder 23. For instance, an arrangement in which a component that limits the rearward movement of the shutter unit 100 (corresponding to the image sensor holder 23 in the above illustrated embodiment) is provided as a component that is movable in the optical axis direction so as not to support the image sensor and in which a stationary member serving as image sensor holder is provided behind this movable component, is also possible.

Although the shutter unit 100 is provided with the front pin support hole 100*c* and the rear pin support hole 100*d* while the second lens group moving frame 8 and the shutter stopper member 5 are provided with the front guide pin 8*e* and the rear guide pin 5*b*, respectively, in the above described embodiment of the zoom lens barrel, it is possible for the front holding member, that corresponds to the shutter unit 100, to be guided in the optical axis direction by a single long guide pin that extends between the front and rear pin support holes 100*c* and 100*d*.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens barrel comprising:
    a front holding member and a rear holding member which hold a front optical element and a rear optical element, respectively, said rear holding member being provided behind said front holding member in an optical axis direction;
    an advancing/retracting member which is moved rearward in said optical axis direction when said lens barrel moves from a ready-to-photograph state to a lens barrel accommodated state, in which no pictures can be taken;
    a first guide portion which guides said front holding member in said optical axis direction relative to said advancing/retracting member;
    a first biasing member which biases said front holding member rearwards in said optical axis direction;
    a second guide portion which guides said rear holding member in said optical axis direction independently of said advancing/retracting member;
    a second biasing member which biases said rear holding member toward front in said optical axis direction; and
    first contact portions provided between said front holding member and said rear holding member, respectively, a rearward movement of said front holding member due to a rearward movement of said advancing/retracting member causing said first contact portions to come into contact with each other to transmit a rearward moving force of said front holding member to said rear holding member against a biasing force of said second biasing member when said lens barrel moves from said ready-to-photograph state to said lens barrel accommodated state,
    wherein said first guide portion, said second guide portion, a first force-applied portion provided between said first biasing member and said front holding member at which said first biasing member and said front holding member are in contact, a second force-applied portion provided between said second biasing member and said rear holding member at which said second biasing member and said rear holding member are in contact with each other, and said first contact portions are all positioned within one of four angular ranges about said optical axis which are defined by dividing 360° into four equiangular ranges as viewed from the front or back of said lens barrel along said optical axis.

2. The lens barrel according to claim 1, further comprising:
    a first stopper which is fixed to said advancing/retracting member and determines a rear movement limit of said front holding member with respect to said advancing/retracting member; and
    a second stopper, a position of which in said optical axis direction is controllable, that determines a front movement limit of said rear holding member.

3. The lens barrel according to claim 1, further comprising second contact portions provided between a rear member, which is provided behind said rear holding member, and one of said front holding member and said rear holding member,
    wherein, during a retracting operation of said lens barrel from said ready-to-photograph state to said lens barrel accommodated state, said second contact portions come into contact with each other before said advancing/retracting member reaches a rear movement limit thereof to limit a rearward movement of said front holding member relative to said rear member one of directly and indirectly via said rear holding member so as to cause relative movement between said front holding member and said advancing/retracting member in said optical axis direction against a biasing force of said first biasing member, and
    wherein said second contact portions are positioned within said one of said four angular ranges.

4. The lens barrel according to claim 3, wherein said rear holding member comprises:
    an optical element holding portion which holds said rear optical element; and
    a radial arm which extends radially outwards from said optical element holding portion, a radially outer end of said radial arm being guided by said second guide portion, and
    wherein said first contact portions include a first rear projection which projects rearward in said optical axis direction from said front holding member to be capable of coming into contact with a front surface of said radial arm.

5. The lens barrel according to claim 4, wherein said second contact portions comprise a second rear projection which projects rearward in said optical axis direction from said front holding member to be capable of coming into contact with a front projection formed on said rear member.

6. The lens barrel according to claim 4, wherein said second contact portions comprise:
    a rear surface formed on said radial arm of said rear holding member, said rear surface facing rearwardly in said optical axis direction; and an abutting surface formed on said rear member, said abutting surface facing forwardly in said optical axis direction to face said rear surface of said radial arm.

7. The lens barrel according to claim 3, wherein said rear member comprises a stationary member which holds an image sensor so that said image sensor lies at an image forming position of an optical system of said lens barrel.

8. The lens barrel according to claim 1, wherein said front optical element that is held by said front holding member comprises light quantity control elements which can be opened and shut, and wherein said rear optical element that is held by said rear holding member comprises a lens group.

9. The lens barrel according to claim 8, wherein said advancing/retracting member holds a front lens group provided in front of said light quantity control elements when said lens barrel is in said ready-to-photograph state, wherein, when said lens barrel moves from said ready-to-photograph state to said lens barrel accommodated state, a movement of said front holding member relative to said advancing/retracting member in said optical axis direction causes said light quantity control elements, which are opened, to surround the outer periphery of said front lens group so that said light quantity control elements and said front lens group coincide with each other in a plane orthogonal to the optical axis.

10. The lens barrel according to claim 1, wherein each of said first biasing member and said second biasing member comprises a spring.

11. The lens barrel according to claim 1, wherein said second guide portion comprises:

a guide shaft extending in said optical axis direction; and a guide hole which is formed through said rear holding member and in which said guide shaft is inserted.

* * * * *